(12) United States Patent
Bhattad et al.

(10) Patent No.: US 8,995,465 B2
(45) Date of Patent: Mar. 31, 2015

(54) REFERENCE SIGNAL PATTERNS

(75) Inventors: Kapil Bhattad, San Diego, CA (US);
Wanshi Chen, San Diego, CA (US);
Juan Montojo, San Diego, CA (US);
Peter Gaal, San Diego, CA (US);
Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 563 days.

(21) Appl. No.: 13/149,766

(22) Filed: May 31, 2011

(65) Prior Publication Data

US 2012/0134273 A1 May 31, 2012

Related U.S. Application Data

(63) Continuation-in-part of application No. 13/100,215, filed on May 3, 2011.

(60) Provisional application No. 61/350,448, filed on Jun. 1, 2010, provisional application No. 61/331,346, filed on May 4, 2010.

(51) Int. Cl.
*H04J 3/16* (2006.01)
*H04J 3/00* (2006.01)
*H04L 5/00* (2006.01)

(52) U.S. Cl.
CPC .................................... *H04L 5/0048* (2013.01)
USPC ............................ 370/468; 370/470; 370/337

(58) Field of Classification Search
CPC ...................................... H04J 3/16; H04J 3/00
USPC ......... 370/242, 245, 244, 252, 253, 254, 329, 370/470, 471, 468, 203–210, 337; 455/450, 455/452.2, 561, 434, 574, 436, 67.11, 437
See application file for complete search history.

(56) References Cited

U.S. PATENT DOCUMENTS

| | | | |
|---|---|---|---|
| 8,208,920 B2 * | 6/2012 | Sampath et al. | 455/434 |
| 8,305,987 B2 * | 11/2012 | Fong et al. | 370/329 |
| 8,315,639 B2 * | 11/2012 | Kim et al. | 455/450 |
| 2009/0252077 A1 * | 10/2009 | Khandekar et al. | 370/312 |
| 2010/0110983 A1 * | 5/2010 | Fu | 370/328 |
| 2010/0150103 A1 | 6/2010 | Womack et al. | |

(Continued)

FOREIGN PATENT DOCUMENTS

| | | |
|---|---|---|
| CN | 101635950 A | 1/2010 |
| WO | WO-2011046387 A2 | 4/2011 |
| WO | WO-2011055986 A2 | 5/2011 |

OTHER PUBLICATIONS

Catt, "Issues concerning CSI-RS design for LTE-A", 3GPP TSG RAN WG1 meeting #59bis, R1-100020, Valencia, Spain, Jan. 18-22, 2010.

(Continued)

*Primary Examiner* — Hanh N Nguyen
(74) *Attorney, Agent, or Firm* — Liem T. Do

(57) ABSTRACT

Certain aspects of the present disclosure provide techniques for allocating resources for use in transmitting reference signals (RSs). According to certain aspects, a large set of enumerated possible CSI-RS resources ("CSI-RS patterns") may be defined and a base station may select a CSI-RS pattern from a subset of the available patterns, with the subset determined by a transmission configuration.

52 Claims, 18 Drawing Sheets

(56) References Cited

U.S. PATENT DOCUMENTS

| | | | |
|---|---|---|---|
| 2011/0170496 A1* | 7/2011 | Fong et al. | 370/329 |
| 2011/0208842 A1 | 8/2011 | Mildh et al. | |
| 2012/0106374 A1* | 5/2012 | Gaal et al. | 370/252 |

OTHER PUBLICATIONS

Huawei, "Inter-cell CSI-RS Analysis", 3GPP TSG RAN WG1 meeting #59bis, R1-100248, Valencia, Spain, Jan. 18-22, 2009.
Qualcomm Europe, "Details of CSI-RS", 3GPP TSG-RAN WG1 #59, R1-094867, Nov. 9-13, 2009, Jeju, Korea.
Qualcomm Europe, "Further considerations and link simulations on reference signals in LTE-A", 3GPP, 3rd Generation Partnership Project, No. R1-090875, Feb. 9, 2009, pp. 1-6, XP002616650.
Qualcomm Europe, "Further details on CSI-RS" 3GPP TSG-RAN WG1 #60, R1-101634, Feb. 22-26, 2010, San Francisco, USA.
Qualcomm Europe, "Further details on CSI-RS", 3GPP TSG-RAN WG1 #60bis, R1-102331, Apr. 12-16, 2010, Beijing, China.
Samsung, "Performance evaluation for CSI-RS design", 3GPP TSG RAN WG1 #59bis, R1-100106, Valencia, Spain, Jan. 18-22, 2009.
"3rd Generation Partnership Project; Technical Specification Group Radio Access Network; Evolved Universal Terrestrial Radio Access (E-UTRA); Further advancements for E-UTRA physical layer aspects (Release 9)", 3GPP TR 36.814 V9.0.0 (Mar. 2010).
"3rd Generation Partnership Project; Technical Specification Group Radio Access Network; Evolved Universal Terrestrial Radio Access (E-UTRA); Physical Channels and Modulation (Release 9)", 3GPP TS 36.211 V9.1.0 (Mar. 2010).
Ericsson et al., "Considerations on CSI-RS Design", 3GPP Draft; R1-102628_Considerations_on_CSI_RS_Design, 3rd Generation Partnership Project (3GPP), Mobile Competence Centre ; 650, Route Des Lucioles ; F-06921 Sophia-Antipolis Cedex ; France, vol. RAN WGI, No. Montreal, Canada; 20100510, May, 5, 2010, XP050420300, [retrieved on May 5, 2010].
ETRI: "Reference signals for eNB-relay backhaul link", 3GPP Draft; RI-094399 Backhaul DL RS, 3rd Generation Partnership Project (3GPP), Mobile Competence Centre ; 650, Route Des Lucioles ; F-06921 Sophia-Antipolis Cedex ; France, No. Miyazaki; 20091012, Oct. 12, 2009, XP050388834.
International Search Report and Written Opinion—PCT/US2011/038822, ISA/EPO—Jul. 20, 2011.
LG Electronics: "Intercell muting for CSI-RS",3GPP Draft; RI-102420 Intercell-CSIRS-Muting, 3rd Generation Partnership Project (3GPP), Mobile Competence Centre ; 650, Route Des Lucioles ; F-06921 Sophia-Antipolis Cedex ; France, vol. RAN WGI, No. Beijing, china; 20100412, Apr. 9, 2010, XP050419750.
LG Electronics: "Remaining Issues on CSI-RS Design", 3GPP Draft; R1-102378, 3rd Generation Partnership Project (3GPP), Mobile Competence Centre ; 650, Route Des Lucioles ; F-06921 Sophia-Antipolis Cedex ; France, vol. RAN WGI, No. Beijing, china; 20100412, Apr. 6, 2010, XP050419601, [retrieved on Apr. 6, 2010].
Nokia et al: "Achievable CQI measurement accuracy over CSI-RS", 3GPP Draft; RI-101900, 3rd Generation Partnership Project (3GPP), Mobile Competence Centre ; 650, Route Des Lucioles ; F-06921 Sophia-Antipolis Cedex ; France, vol. RAN WGI, No. Beijing, china; 20100412, Apr. 7, 2010, XP050419674.
Nokia Siemens Networks et al: "Control Channel for Relay Backhaul link" 3GPP Draft; R1-091763_Control_Relays_Backhaul, 3rd Generation Partnership Project (3GPP), Mobile Competence Centre; 650, Route Des Lucioles ; F-06921 Sophia-Antipolis Cedex; France, No. San Francisco, USA; 20090428, Apr. 28, 2009, XP050339287.
Ntt Docomo: "DL RS Design for LTE-Advanced", 3GPP Draft; RI-091483 DL RS, 3rd Generation Partnership Project (3GPP), Mobile Competence Centre ; 650, Route Des Lucioles ; F-06921 Sophia-Antipolis Cedex ; France, No. Seoul, Korea; 20090318, Mar. 18, 2009, XP050339046.
Parkvall S et al., "The Evolution of LTE towards IMT-Advanced", Journal of Communications, Academy Publishers, Oulu, FI, vol. 4, No. 3, Apr. 1, 2009, pp. 146-154, XP008113534, ISSN: 1796-2021, DOI:10.4304/JCM.4.3.146-154.
Qualcomm Inc: "Benefits of Muting for Enhanced CSI Estimation", 3GPP Draft; RI-102332 Benefits of Muting, 3rd Generation Partnership Project (3GPP), Mobile Competence Centre ; 650, Route Des Lucioles ; F-06921 Sophia-Antipolis Cedex ; France, vol. RAN WGI, No. Beijing, china; 20100412, Apr. 7, 2010, XP050419699.
Texas Instruments: "PDSCH Muting: N-MSE for Inter-cell CSI Estimation", 3GPP Draft; RI-102099 TI NMSE for Inter-Cell CSI Estimation, 3rd Generation Partnership Project (3QPP), Mobile Competence Centre ; 650, Route Des Lucioles ; F-06921 Sophia-Antipolis Cedex ; France, vol. RAN WGI, No. Beijing, china; 20100412, Apr. 9, 2010, XP050419746.
ZTE: "CSI-RS Pattern and Configuration", 3GPP Draft; R1-102899 CSI-RS Pattern and Configuration, 3rd Generation Partnership Project (3GPP), Mobile Competence Centre ; 650, Route Des Lucioles ; F-06921 Sophia-Antipolis Cedex ; France, vol. RAN WGI, No. Montreal, Canada; 20100510, May 4, 2010, XP050420039, [retrieved on May 4, 2010].
Huawei: "CSI-RS Pattern Design", 3GPP TSG-RAN WG1 Meeting #61, R1-103101, May 10, 2010.
Qualcomm Incorporated: "Further details on CSI-RS", 3GPP TSG-RAN WG1 Meeting #60b, R1-103288, May 10, 2010.
Samsung: "Discussion on CSI-RS based CQI Reporting for Rel-10", 3GPP TSG-RAN WG1 meeting #61, R1-103030, May 10, 2010.
Samsung: "Discussions on CSI-RS for LTE-Advanced", 3GPP TSG-RAN WG1 Meeting #59, R1-094574, Nov. 9, 2009.
Woasis: "Multi-Cell CSI-RS Pattern and Sequence", 3GPP TSG-RAN WG1 Meeting #59, R1-094907, Nov. 9, 2009.
ZTE Corporation, "CSI-RS Pattern Design for LTE-Advanced", 3GPP TSG-RAN WG1 Meeting #60 R1-100969, Feb. 18, 2010, <http://www.3gpp.org/ftp/tsg_ran/wg1_rl1/TSGR1_60/Docs/>.
ZTE: "DL Reference Signal Design for CSI generation in LTE-Advanced", 3GPP TSG-RAN WG1 Meeting #57, R1-091714, May 4, 2009.
3GPP TSG RAN WG1 meeting #60, CSI-RS Pattern Design, Huawei, R1-101057, San Francisco, USA, Feb. 22-26, 2010, pp. 1-6.
Qualcomm Incorporated, "CSI-RS for LTE-Advanced", 3GPP TSG-RAN WG1#61b, R1-103545, Jun. 22, 2010, Retreived from the Internet: http://www.3gpp.org/ftp/tsg_ran/WG1_RL1/TSGR1_61b/Docs/R1-103545.zip, pp. 1-8.
NTT DoCoMo, Intra-cell CSI-RS designu, 3GPP Draft; R1-103253 Intra-Cell CSI RS, 3rd Generation Partnership Project (3GPP), Mobile Competence Centre; 650, Route Des Luci Oles; F-06921 Sophi A-Anti Poll S Cedex; France, vol. RAN WG1, no. Montreal, Canada; 20100510, May 4, 2010, XP050420281.

* cited by examiner

Table 1010:

|   |   |   |   |   |   |   |   |   |   |   |    |    |    |
|---|---|---|---|---|---|---|---|---|---|---|----|----|----|
|   |   | 1 | 3 | 3 | D | D | 7 | 7 | 10 | 10 | 13 | D  | D  |
|   |   | 1 | 3 | 3 | D | D | 7 | 7 | 10 | 10 | 13 | D  | D  |
| C | C | 1 | 3 | 3 | 6 | 6 | 7 | 7 | 10 | 10 | 13 | 14 | 14 |
|   |   | 1 | 3 | 3 | 6 | 6 | 7 | 7 | 10 | 10 | 13 | 14 | 14 |
|   |   | 2 | 4 | 4 |   |   | 8 | 8 | 11 | 11 | 2  |    |    |
| C | C | 2 | 4 | 4 | D | D | 8 | 8 | 11 | 11 | 2  | D  | D  |
|   |   | 2 | 4 | 4 | D | D | 8 | 8 | 11 | 11 | 2  | D  | D  |
|   |   | 2 | 4 | 4 |   |   | 8 | 8 | 11 | 11 | 2  |    |    |
| C | C | 1 | 5 | 5 | 6 | 6 | 9 | 9 | 12 | 12 | 13 | 14 | 14 |
|   |   | 1 | 5 | 5 | 6 | 6 | 9 | 9 | 12 | 12 | 13 | 14 | 14 |
|   |   | 1 | 5 | 5 | D | D | 9 | 9 | 12 | 12 | 13 | D  | D  |
| C | C | 1 | 5 | 5 | D | D | 9 | 9 | 12 | 12 | 13 | D  | D  |

Table 1020:

|   |   |   |   |   |   |   |   |   |    |    |   |    |    |
|---|---|---|---|---|---|---|---|---|----|----|---|----|----|
|   |   | 1 | 1 | D | D | 6 | 6 | 9 | 9  |    |   | D  | D  |
|   |   | 1 | 1 | D | D | 6 | 6 | 9 | 9  |    |   | D  | D  |
| C | C | 1 | 1 | 4 | 4 | 6 | 6 | 9 | 9  |    |   | 12 | 12 |
|   |   | 1 | 1 | 4 | 4 | 6 | 6 | 9 | 9  |    |   | 12 | 12 |
|   |   | 2 | 2 | 5 | 5 | 7 | 7 | 10 | 10 |    |   | 5  | 5  |
| C | C | 2 | 2 | D | D | 7 | 7 | 10 | 10 |    |   | D  | D  |
|   |   | 2 | 2 | D | D | 7 | 7 | 10 | 10 |    |   | D  | D  |
|   |   | 2 | 2 | 5 | 5 | 7 | 7 | 10 | 10 |    |   | 5  | 5  |
| C | C | 3 | 3 | 4 | 4 | 8 | 8 | 11 | 11 |    |   | 12 | 12 |
|   |   | 3 | 3 | 4 | 4 | 8 | 8 | 11 | 11 |    |   | 12 | 12 |
|   |   | 3 | 3 | D | D | 8 | 8 | 11 | 11 |    |   | D  | D  |
| C | C | 3 | 3 | D | D | 8 | 8 | 11 | 11 |    |   | D  | D  |

Table 1030:

|   |   |   |   |   |   |   |    |    |    |    |    |    |    |
|---|---|---|---|---|---|---|----|----|----|----|----|----|----|
|   |   | 1 | 3 | 3 | D | D | 8  | 8  | 11 | 11 | 14 | D  | D  |
|   |   | 1 | 3 | 3 | D | D | 8  | 8  | 11 | 11 | 14 | D  | D  |
| C | C | 1 | 3 | 3 | 6 | 6 | 8  | 8  | 11 | 11 | 14 | 15 | 15 |
|   |   | 1 | 3 | 3 | 6 | 6 | 8  | 8  | 11 | 11 | 14 | 15 | 15 |
|   |   | 2 | 4 | 4 | 7 | 7 | 9  | 9  | 12 | 12 | 2  | 7  | 7  |
| C | C | 2 | 4 | 4 | D | D | 9  | 9  | 12 | 12 | 2  | D  | D  |
|   |   | 2 | 4 | 4 | D | D | 9  | 9  | 12 | 12 | 2  | D  | D  |
|   |   | 2 | 4 | 4 | 7 | 7 | 9  | 9  | 12 | 12 | 2  | 7  | 7  |
| C | C | 1 | 5 | 5 | 6 | 6 | 10 | 10 | 13 | 13 | 14 | 15 | 15 |
|   |   | 1 | 5 | 5 | 6 | 6 | 10 | 10 | 13 | 13 | 14 | 15 | 15 |
|   |   | 1 | 5 | 5 | D | D | 10 | 10 | 13 | 13 | 14 | D  | D  |
| C | C | 1 | 5 | 5 | D | D | 10 | 10 | 13 | 13 | 14 | D  | D  |

| | | | | | D | D | | | 2 | 2 | | D | D |
|---|---|---|---|---|---|---|---|---|---|---|---|---|---|
| | | | | | D | U | | | 2 | 2 | | D | U |
| C | C | | | C | 1 | 1 | C | C | 2 | 2 | C | 4 | 4 |
| | | | U | | 1 | 1 | | | 2 | U | | 4 | 4 |
| | | | | | 1 | 1 | | | 2 | 2 | | 4 | 4 |
| C | C | | | C | D | U | C | C | 2 | 2 | C | D | U |
| | | | | | D | D | | | 3 | 3 | | D | D |
| | | | U | | 1 | 1 | | | 3 | U | | 4 | 4 |
| C | C | | | C | 1 | 1 | C | C | 3 | 3 | C | 4 | 4 |
| | | | | | 1 | U | | | 3 | 3 | | 4 | U |
| | | | | | D | D | | | 3 | 3 | | D | D |
| C | C | | U | C | D | D | C | C | 3 | U | C | D | D |

1220

| | | | | | D | U | | | 2 | 2 | | D | U |
|---|---|---|---|---|---|---|---|---|---|---|---|---|---|
| | | | | | D | D | | | 2 | 2 | | D | D |
| C | C | | U | C | 1 | 1 | C | C | 2 | U | C | 4 | 4 |
| | | | | | 1 | 1 | | | 2 | 2 | | 4 | 4 |
| | | | | | 1 | U | | | 2 | 2 | | 4 | U |
| C | C | | | C | D | D | C | C | 2 | 2 | C | D | D |
| | | | U | | D | D | | | 3 | U | | D | D |
| | | | | | 1 | 1 | | | 3 | 3 | | 4 | 4 |
| C | C | | | C | 1 | U | C | C | 3 | 3 | C | 4 | U |
| | | | | | 1 | 1 | | | 3 | 3 | | 4 | 4 |
| | | | U | | D | D | | | 3 | U | | D | D |
| C | C | | | C | D | D | C | C | 3 | 3 | C | D | D |

1230

| | | | | | D | D | | | 2 | 2 | | D | D |
|---|---|---|---|---|---|---|---|---|---|---|---|---|---|
| | | | U | | D | D | | | 2 | U | | D | D |
| C | C | | | C | 1 | 1 | C | C | 2 | 2 | C | 4 | 4 |
| | | | | | 1 | U | | | 2 | 2 | | 4 | U |
| | | | | | 1 | 1 | | | 2 | 2 | | 4 | 4 |
| C | C | | U | C | D | D | C | C | 2 | U | C | D | D |
| | | | | | D | D | | | 3 | 3 | | D | D |
| | | | | | 1 | U | | | 3 | 3 | | 4 | U |
| C | C | | | C | 1 | 1 | C | C | 3 | 3 | C | 4 | 4 |
| | | | U | | 1 | 1 | | | 3 | U | | 4 | 4 |
| | | | | | D | D | | | 3 | 3 | | D | D |
| C | C | | | C | D | U | C | C | 3 | 3 | C | D | U |

|   |   |   | 1 |   | D | D |   |   | 3 | 3 |   | D | D |
|---|---|---|---|---|---|---|---|---|---|---|---|---|---|
|   |   |   | 1 |   | D | U |   |   | 3 | 3 |   | D | U |
| C | C |   | 1 | C | 2 | 2 | C | C | 3 | 3 | C | 5 | 5 |
|   |   |   | U |   | 2 | 2 |   |   | 3 | U |   | 5 | 5 |
|   |   |   | 1 |   | 2 | 2 |   |   | 3 | 3 |   | 5 | 5 |
| C | C |   | 1 | C | D | U | C | C | 3 | 3 | C | D | U |
|   |   |   | 1 |   | D | D |   |   | 4 | 4 |   | D | D |
|   |   |   | U |   | 2 | 2 |   |   | 4 | U |   | 5 | 5 |
| C | C |   | 1 | C | 2 | 2 | C | C | 4 | 4 | C | 5 | 5 |
|   |   |   | 1 |   | 2 | U |   |   | 4 | 4 |   | 5 | U |
|   |   |   | 1 |   | D | D |   |   | 4 | 4 |   | D | D |
| C | C |   | U | C | D | D | C | C | 4 | U | C | D | D |

1320

|   |   |   | 1 |   | D | U |   |   | 3 | 3 |   | D | U |
|---|---|---|---|---|---|---|---|---|---|---|---|---|---|
|   |   |   | 1 |   | D | D |   |   | 3 | 3 |   | D | D |
| C | C |   | U | C | 2 | 2 | C | C | 3 | U | C | 5 | 5 |
|   |   |   | 1 |   | 2 | 2 |   |   | 3 | 3 |   | 5 | 5 |
|   |   |   | 1 |   | 2 | U |   |   | 3 | 3 |   | 5 | U |
| C | C |   | 1 | C | D | D | C | C | 3 | 3 | C | D | D |
|   |   |   | U |   | D | D |   |   | 4 | U |   | D | D |
|   |   |   | 1 |   | 2 | 2 |   |   | 4 | 4 |   | 5 | 5 |
| C | C |   | 1 | C | 2 | U | C | C | 4 | 4 | C | 5 | U |
|   |   |   | 1 |   | 2 | 2 |   |   | 4 | 4 |   | 5 | 5 |
|   |   |   | U |   | D | D |   |   | 4 | U |   | D | D |
| C | C |   | 1 | C | D | D | C | C | 4 | 4 | C | D | D |

1330

|   |   |   | 1 |   | D | D |   |   | 3 | 3 |   | D | D |
|---|---|---|---|---|---|---|---|---|---|---|---|---|---|
|   |   |   | U |   | D | D |   |   | 3 | U |   | D | D |
| C | C |   | 1 | C | 2 | 2 | C | C | 3 | 3 | C | 5 | 5 |
|   |   |   | 1 |   | 2 | U |   |   | 3 | 3 |   | 5 | U |
|   |   |   | 1 |   | 2 | 2 |   |   | 3 | 3 |   | 5 | 5 |
| C | C |   | U | C | D | D | C | C | 3 | U | C | D | D |
|   |   |   | 1 |   | D | D |   |   | 4 | 4 |   | D | D |
|   |   |   | 1 |   | 2 | U |   |   | 4 | 4 |   | 5 | U |
| C | C |   | 1 | C | 2 | 2 | C | C | 4 | 4 | C | 5 | 5 |
|   |   |   | U |   | 2 | 2 |   |   | 4 | U |   | 5 | 5 |
|   |   |   | 1 |   | D | D |   |   | 4 | 4 |   | D | D |
| C | C |   | 1 | C | D | U | C | C | 4 | 4 | C | D | U |

| | | | | | D | D | | D | D | 1 |
|---|---|---|---|---|---|---|---|---|---|---|
| | | | | | D | U | | D | U | 1 |
| C | C | | | C | 1 | 1 | C | C | 2 | 2 | C | 3 |
| | | U | | 1 | 1 | | | 2 | 2 | | 3 |
| | | | | | | 1 | | | | 2 | | 3 |
| C | C | | | C | D | U | C | C | D | U | C | 3 |
| | | | | | D | D | | | D | D | | 3 |
| | | U | | | | 1 | | | | 2 | | 3 |
| C | C | | | C | 1 | 1 | C | C | 2 | 2 | C | 3 |
| | | | | | 1 | U | | | 2 | U | | 3 |
| | | | | | D | D | | | D | D | | 2 |
| C | C | | U | C | D | D | C | C | D | D | C | 2 |

1420

| | | | | | D | U | | D | U | 1 |
|---|---|---|---|---|---|---|---|---|---|---|
| | | | | | D | D | | D | D | 1 |
| C | C | | U | C | 1 | 1 | C | C | 2 | 2 | C | 3 |
| | | | | | 1 | 1 | | | 2 | 2 | | 3 |
| | | | | | | U | | | | U | | 3 |
| C | C | | | C | D | D | C | C | D | D | C | 3 |
| | | U | | | D | D | | | D | D | | 3 |
| | | | | | | 1 | | | | 2 | | 3 |
| C | C | | | C | 1 | U | C | C | 2 | U | C | 3 |
| | | | | | 1 | 1 | | | 2 | 2 | | 3 |
| | | U | | | D | D | | | D | D | | 2 |
| C | C | | | C | D | D | C | C | D | D | C | 2 |

1430

| | | | | | D | D | | D | D | 1 |
|---|---|---|---|---|---|---|---|---|---|---|
| | | U | | | D | D | | D | D | 1 |
| C | C | | | C | 1 | 1 | C | C | 2 | 2 | C | 3 |
| | | | | | 1 | U | | | 2 | U | | 3 |
| | | | | | | 1 | | | | 2 | | 3 |
| C | C | | U | C | D | D | C | C | D | D | C | 3 |
| | | | | | D | D | | | D | D | | 3 |
| | | | | | | U | | | | U | | 3 |
| C | C | | | C | 1 | 1 | C | C | 2 | 2 | C | 3 |
| | | U | | | 1 | 1 | | | 2 | 2 | | 3 |
| | | | | | D | D | | | D | D | | 2 |
| C | C | | | C | D | U | C | C | D | U | C | 2 |

|   |   |   |   | D | D |   |   | 2 | 2 |   |   |
|---|---|---|---|---|---|---|---|---|---|---|---|
|   |   |   |   | D | U |   |   | 2 | 2 |   |   |
| C | C |   | C | 1 | 1 | C | C | 2 | 2 | C |   |
|   |   | U |   | 1 | 1 |   |   | 2 | U |   |   |
|   |   |   |   | 1 | 1 |   |   | 2 | 2 |   |   |
| C | C |   | C | D | U | C | C | 2 | 2 | C |   |
|   |   |   |   | D | D |   |   | 3 | 3 |   |   |
|   |   | U |   | 1 | 1 |   |   | 3 | U |   |   |
| C | C |   | C | 1 | 1 | C | C | 3 | 3 | C |   |
|   |   |   |   | 1 | U |   |   | 3 | 3 |   |   |
|   |   |   |   | D | D |   |   | 3 | 3 |   |   |
| C | C |   | U | C | D | D | C | C | 3 | U | C |

1810

|   |   |   |   | D | U |   |   | 2 | 2 |   |   |
|---|---|---|---|---|---|---|---|---|---|---|---|
|   |   |   |   | D | D |   |   | 2 | 2 |   |   |
| C | C |   | U | C | 1 | 1 | C | C | 2 | U | C |
|   |   |   |   | 1 | 1 |   |   | 2 | 2 |   |   |
|   |   |   |   | 1 | U |   |   | 2 | 2 |   |   |
| C | C |   | C | D | D | C | C | 2 | 2 | C |   |
|   |   | U |   | D | D |   |   | 3 | U |   |   |
|   |   |   |   | 1 | 1 |   |   | 3 | 3 |   |   |
| C | C |   | C | 1 | U | C | C | 3 | 3 | C |   |
|   |   |   |   | 1 | 1 |   |   | 3 | 3 |   |   |
|   |   | U |   | D | D |   |   | 3 | U |   |   |
| C | C |   |   | C | D | D | C | C | 3 | 3 | C |

1820

|   |   |   |   | D | D |   |   | 2 | 2 |   |   |
|---|---|---|---|---|---|---|---|---|---|---|---|
|   |   | U |   | D | D |   |   | 2 | U |   |   |
| C | C |   | C | 1 | U | C | C | 2 | 2 | C |   |
|   |   |   |   | 1 | 1 |   |   | 2 | 2 |   |   |
|   |   |   |   | 1 | 1 |   |   | 2 | 2 |   |   |
| C | C |   | U | C | D | D | C | C | 2 | U | C |
|   |   |   |   | D | U |   |   | 3 | 3 |   |   |
|   |   |   |   | 1 | 1 |   |   | 3 | 3 |   |   |
| C | C |   | C | 1 | 1 | C | C | 3 | 3 | C |   |
|   |   | U |   | 1 | 1 |   |   | 3 | U |   |   |
|   |   |   |   | D | U |   |   | 3 | 3 |   |   |
| C | C |   | C | D | D | C | C | 3 | 3 | C |   |

1830

REFERENCE SIGNAL PATTERNS

CROSS-REFERENCE TO RELATED APPLICATIONS

This application claims priority to U.S. Provisional Application Ser. No. 61/350,448, filed on Jun. 1, 2010, and is also a continuation-in-part of U.S. application Ser. No. 13/100,215, filed May 3, 2011, which claims priority to U.S. Provisional Application Ser. No. 61/331,346, filed on May 4, 2010, all of which are expressly incorporated by reference herein in their entirety.

BACKGROUND

I. Field

The present disclosure relates generally to communication, and more specifically to techniques for making measurements in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

Various reference signals (RSs), known to the UEs, may be transmitted in the downlink, for example, to facilitate channel estimation. In some cases, cell-specific RSs are provided, which are common to all UEs in a cell. In addition, UE-specific RSs may be also be transmitted, embedded in data targeting specific UEs. Further, Multimedia Broadcast Single Frequency Network (MBSFN)-specific RSs may also be provided in case of MBSFN configurations. These RSs typically occupy specified resource elements (REs) within an Orthogonal Frequency Division Multiplexed (OFDM) symbol.

SUMMARY

Certain aspects of the present disclosure provide a method for wireless communication. The method generally includes identifying a set of available channel state information reference signal (CSI-RS) patterns defining resources for use in transmitting CSI-RS in a subframe from multiple antenna ports, identifying a subset of the set of available CSI-RS patterns based on a transmission configuration, selecting one of the CSI-RS patterns from the subset, and transmitting CSI-RS in the subframe according to the selected CSI-RS pattern.

Certain aspects of the present disclosure provide a method for wireless communication. The method includes identifying a set of available channel state information reference signal (CSI-RS) patterns defining resources for use in transmitting CSI-RS in a subframe from multiple antenna ports, identifying a CSI-RS pattern, selected from a subset of the set of available CSI-RS patterns used for transmitting CSI-RS for a particular transmission configuration, and receiving CSI-RS in the subframe, the CSI-RS transmitted according to the selected CSI-RS pattern.

Certain aspects of the present disclosure provide an apparatus for wireless communication. The apparatus includes means for identifying a set of available channel state information reference signal (CSI-RS) patterns defining resources for use in transmitting CSI-RS in a subframe from multiple antenna ports, means for identifying a subset of the set of available CSI-RS patterns based on a transmission configuration, means for selecting one of the CSI-RS patterns from the subset, and means for transmitting CSI-RS in the subframe according to the selected CSI-RS pattern.

Certain aspects of the present disclosure provide an apparatus for wireless communication. The apparatus includes means for identifying a set of available channel state information reference signal (CSI-RS) patterns defining resources for use in transmitting CSI-RS in a subframe from multiple antenna ports, means for identifying a CSI-RS pattern, selected from a subset of the set of available CSI-RS patterns used for transmitting CSI-RS for a particular transmission configuration, and means for receiving CSI-RS in the subframe, the CSI-RS transmitted according to the selected CSI-RS pattern.

Certain aspects of the present disclosure provide an apparatus for wireless communication. The apparatus includes at least one processor configured to identify a set of available channel state information reference signal (CSI-RS) patterns defining resources for use in transmitting CSI-RS in a subframe from multiple antenna ports, identify a subset of the set of available CSI-RS patterns based on a transmission configuration, select one of the CSI-RS patterns from the subset, and means for transmitting CSI-RS in the subframe according to the selected CSI-RS pattern; and a memory coupled with the at least one processor.

Certain aspects of the present disclosure provide an apparatus for wireless communication. The apparatus includes at least one processor configured to identify a set of available channel state information reference signal (CSI-RS) patterns defining resources for use in transmitting CSI-RS in a subframe from multiple antenna ports, identify a CSI-RS pattern, select from a subset of the set of available CSI-RS patterns used for transmitting CSI-RS for a particular transmission configuration, and receive CSI-RS in the subframe, the CSI-RS transmitted according to the selected CSI-RS pattern; and a memory coupled with the at least one processor.

Certain aspects of the present disclosure provide a computer program product comprising a computer-readable medium having instructions stored thereon for wireless communications, the instructions executable by one or more processors for identifying a set of available channel state information reference signal (CSI-RS) patterns defining resources for use in transmitting CSI-RS in a subframe from multiple antenna ports, identifying a subset of the set of available CSI-RS patterns based on a transmission configuration, selecting one of the CSI-RS patterns from the subset, and transmitting CSI-RS in the subframe according to the selected CSI-RS pattern.

Certain aspects of the present disclosure provide a computer program product comprising a computer-readable medium having instructions stored thereon for wireless communications, the instructions executable by one or more processors for identifying a set of available channel state information reference signal (CSI-RS) patterns defining resources for use in transmitting CSI-RS in a subframe from multiple antenna ports, identifying a CSI-RS pattern, selected from a subset of the set of available CSI-RS patterns used for transmitting CSI-RS for a particular transmission configuration, and receiving CSI-RS in the subframe, the CSI-RS transmitted according to the selected CSI-RS pattern.

BRIEF DESCRIPTION OF THE DRAWINGS

FIGS. 8-9 illustrate example CSI-RS patterns for subframes transmitted to a relay, in accordance with certain aspects of the present disclosure.

FIG. 10 illustrates example CSI-RS patterns for MBSFN subframes, in accordance with certain aspects of the present disclosure.

FIGS. 11-13 illustrate example CSI-RS patterns for FDD subframes, in accordance with certain aspects of the present disclosure.

FIGS. 14-18 illustrate example CSI-RS patterns for subframes transmitted to a relay, in accordance with certain aspects of the present disclosure.

DETAILED DESCRIPTION

Certain aspects of the present disclosure provide techniques for allocating resources for use in transmitting reference signals (RSs). According to certain aspects, a large set of enumerated possible CSI-RS resources ("CSI-RS patterns") may be defined and a base station may select a CSI-RS pattern from a subset of the available patterns, with the subset determined by a transmission configuration.

As an example, in deployments where a base station transmits UE-RS signals on antenna port 5, the base station may be configured to select CSI-RS patterns that avoid these resources. On the other hand, in deployments where UE-RS signals are not transmitted on antenna port 5, the base station may choose from a wider range of CSI-RS patterns (e.g., without regard to whether a pattern avoids REs used for antenna port 5 REs).

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
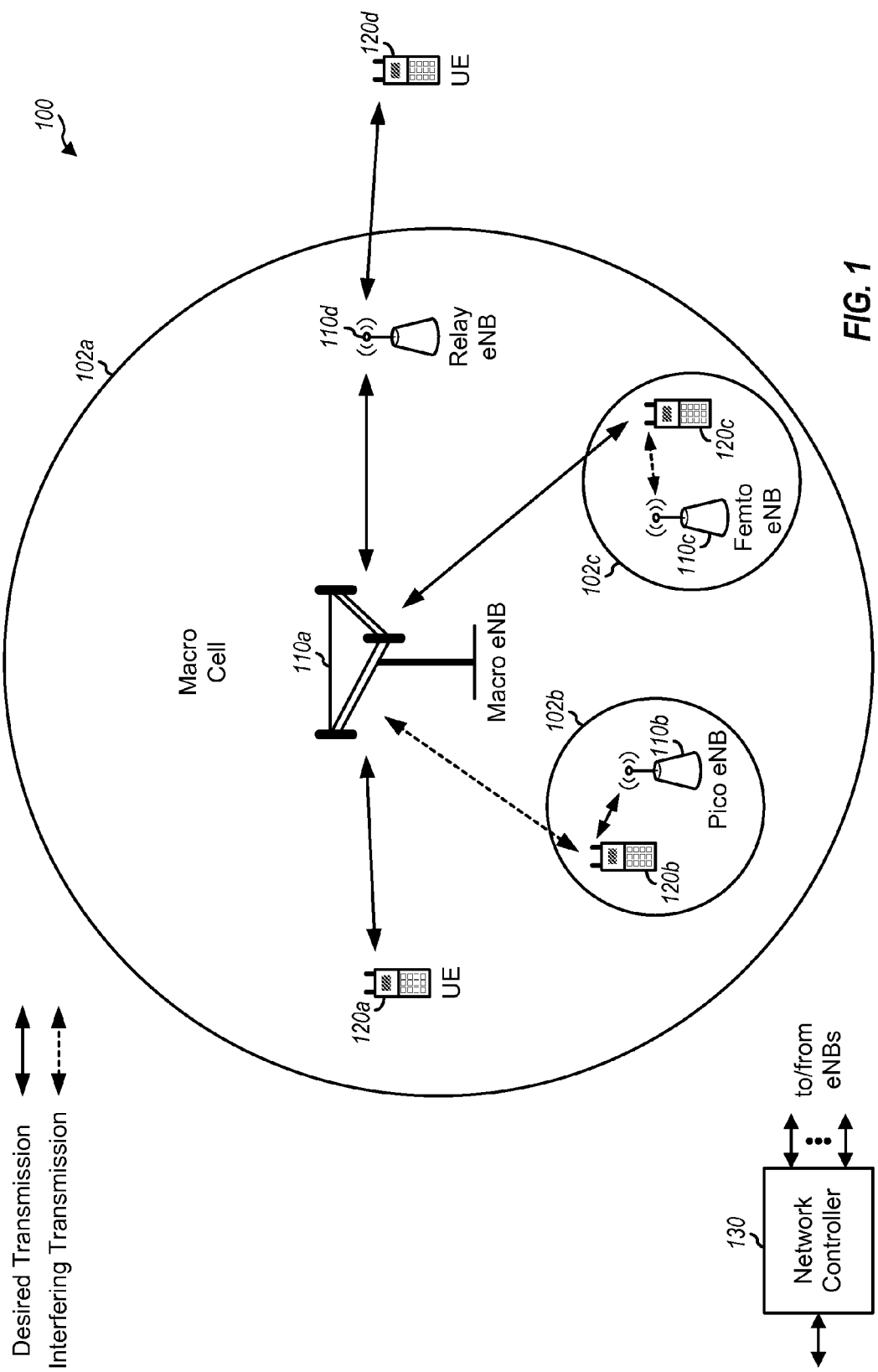
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, tablet, etc.

Figure 2:
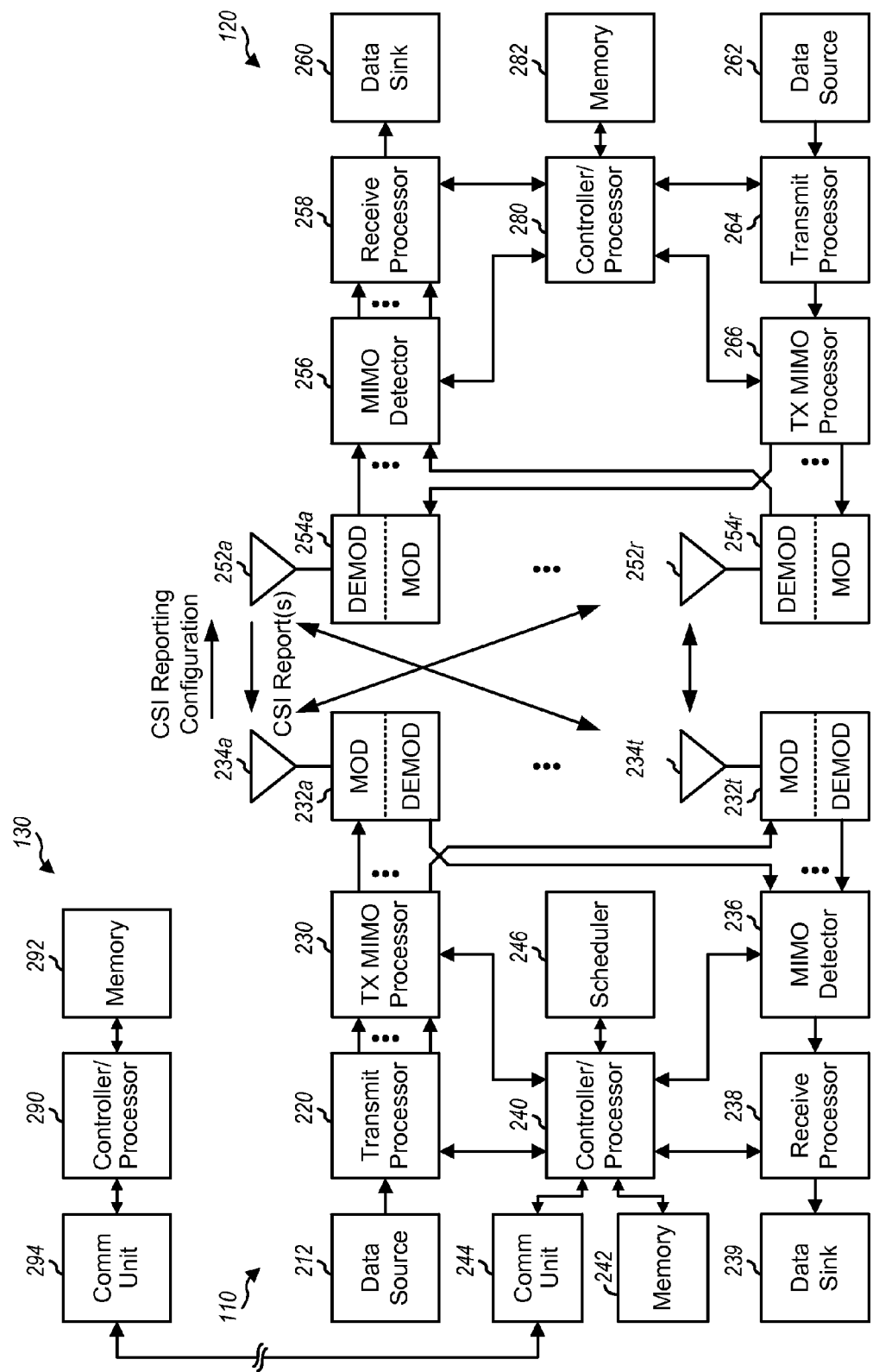
FIG. 2 shows a block diagram of a base station and a UE.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor 284 may determine RSRP, RSSI, RSRQ, CQI, etc., as described below.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240.

Controllers/processors 240 and 280 may direct the operation at base station 110 and UE 120, respectively. Processor 240 and/or other processors and modules at base station 110 may perform or direct operations 600 of FIG. 6 and/or other processes for the techniques described herein. Processor 280 and/or other processors and modules at UE 120 may perform or direct operations 650 of FIG. 6 and/or other processes for the techniques described herein. Memories 242 and 282 may store data and program codes for base station 110 and UE 120, respectively. A scheduler 244 may schedule UEs for data transmission on the downlink and/or uplink.

Figure 3:
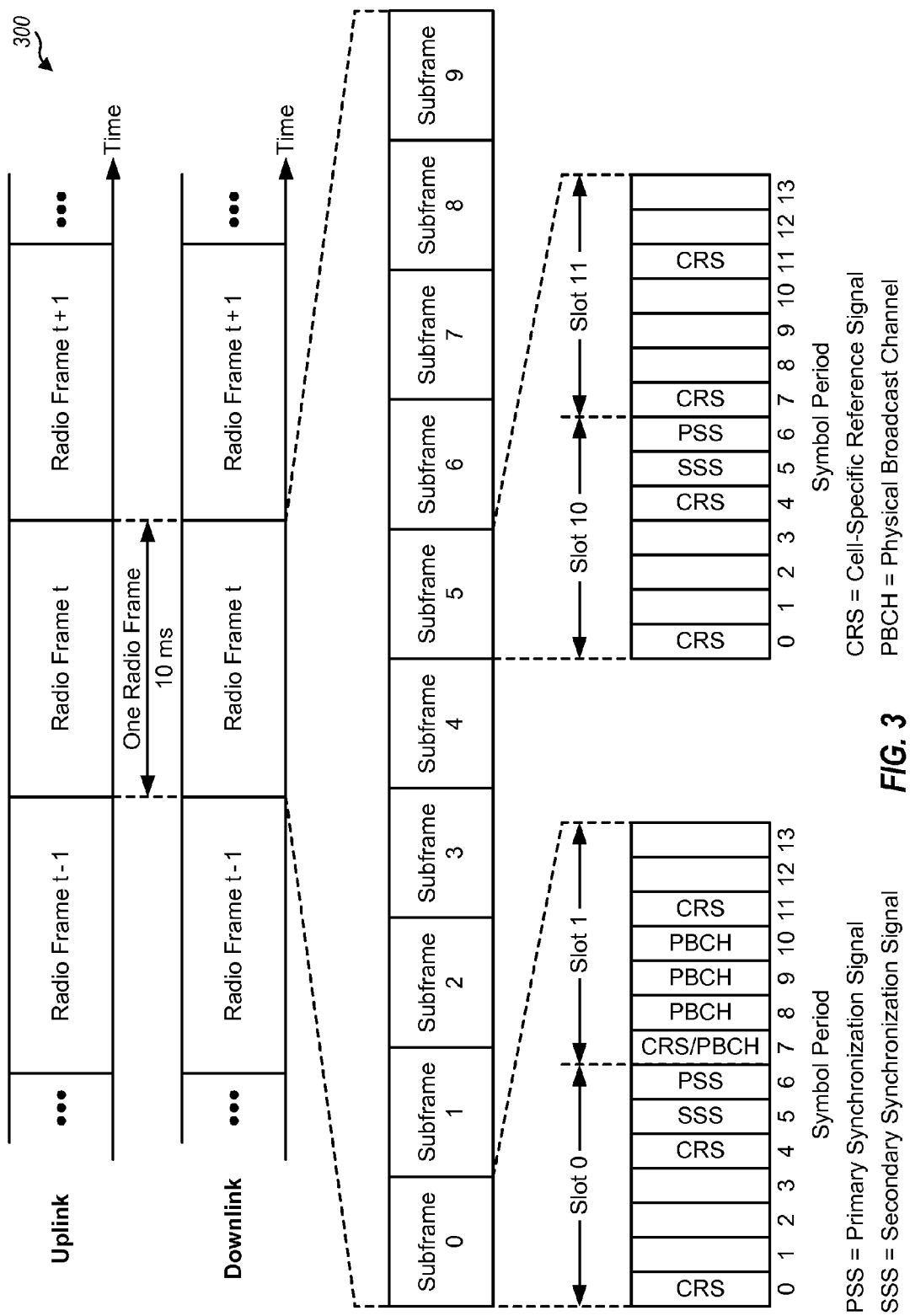
FIG. 3 shows a frame structure for frequency division duplexing (FDD).

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L-1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

Figure 4:
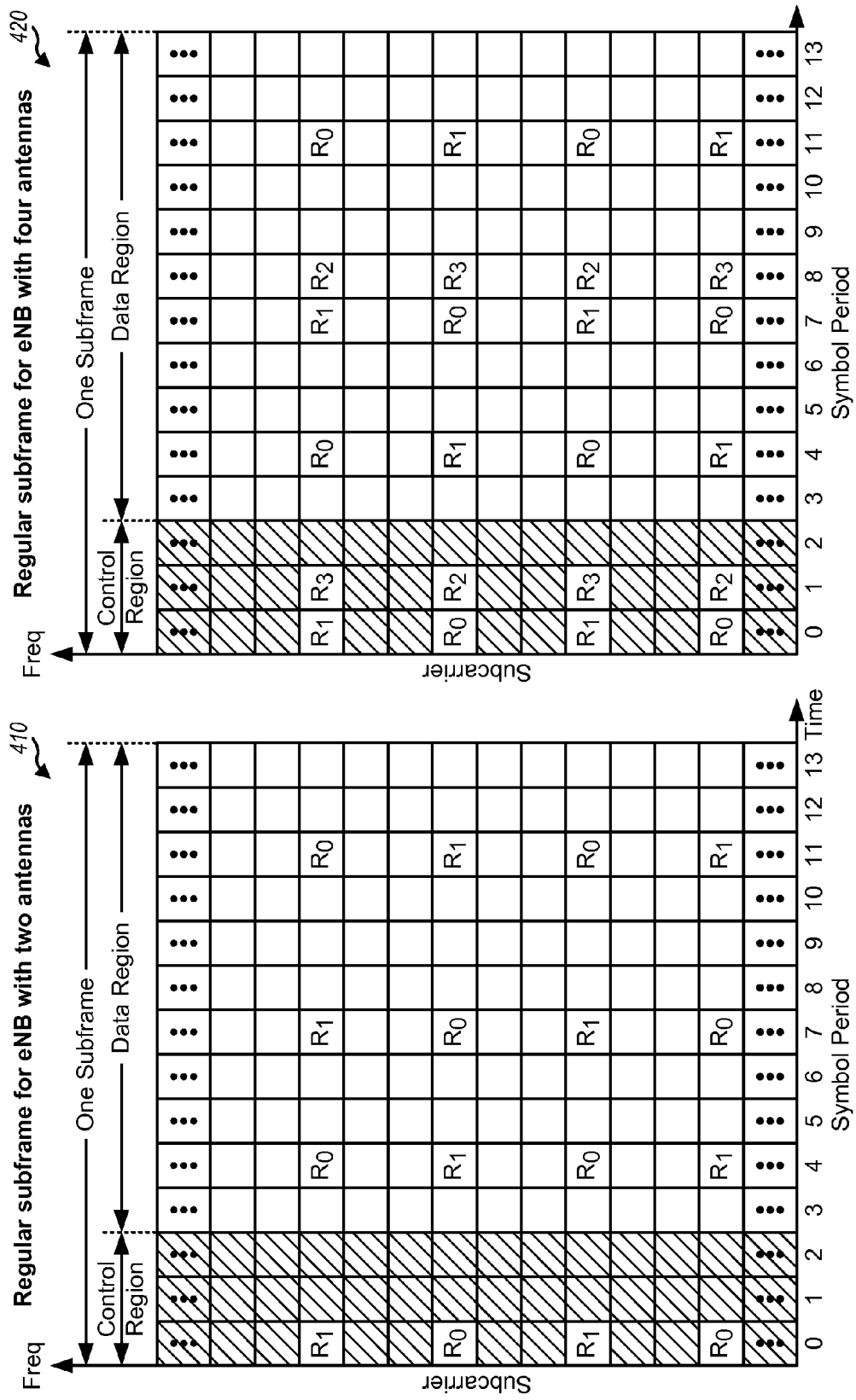
FIG. 4 shows two exemplary subframe formats for the downlink.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label R_a, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, ..., Q−1}.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

According to certain aspects, a relatively large set of CSI-RS patterns defining resources to use for transmitting CSI-RS may be defined. A base station may identify a subset of these CSI-RS patterns based, at least in part, on a transmission configuration. A base station may then select a pattern from the identified subset and transmit CSI-RS according to the selected pattern.

As will be described in greater detail below, example transmission configurations that may utilize different subsets of CSI-RS patterns may include, for example, configurations for MBSFN transmissions, configurations for transmissions to a relay device, and configurations to utilize a particular antenna port (e.g., antenna port 5) to transmit UE-specific RS.

Utilizing a larger set of CSI-RS patterns may simplify system design while allowing different subsets to be used for different transmission configurations. For example, as will be described in greater detail below, such an approach may simplify signaling, as a particular CSI-pattern selected from the group may be identified with a single index value.

Figure 5:
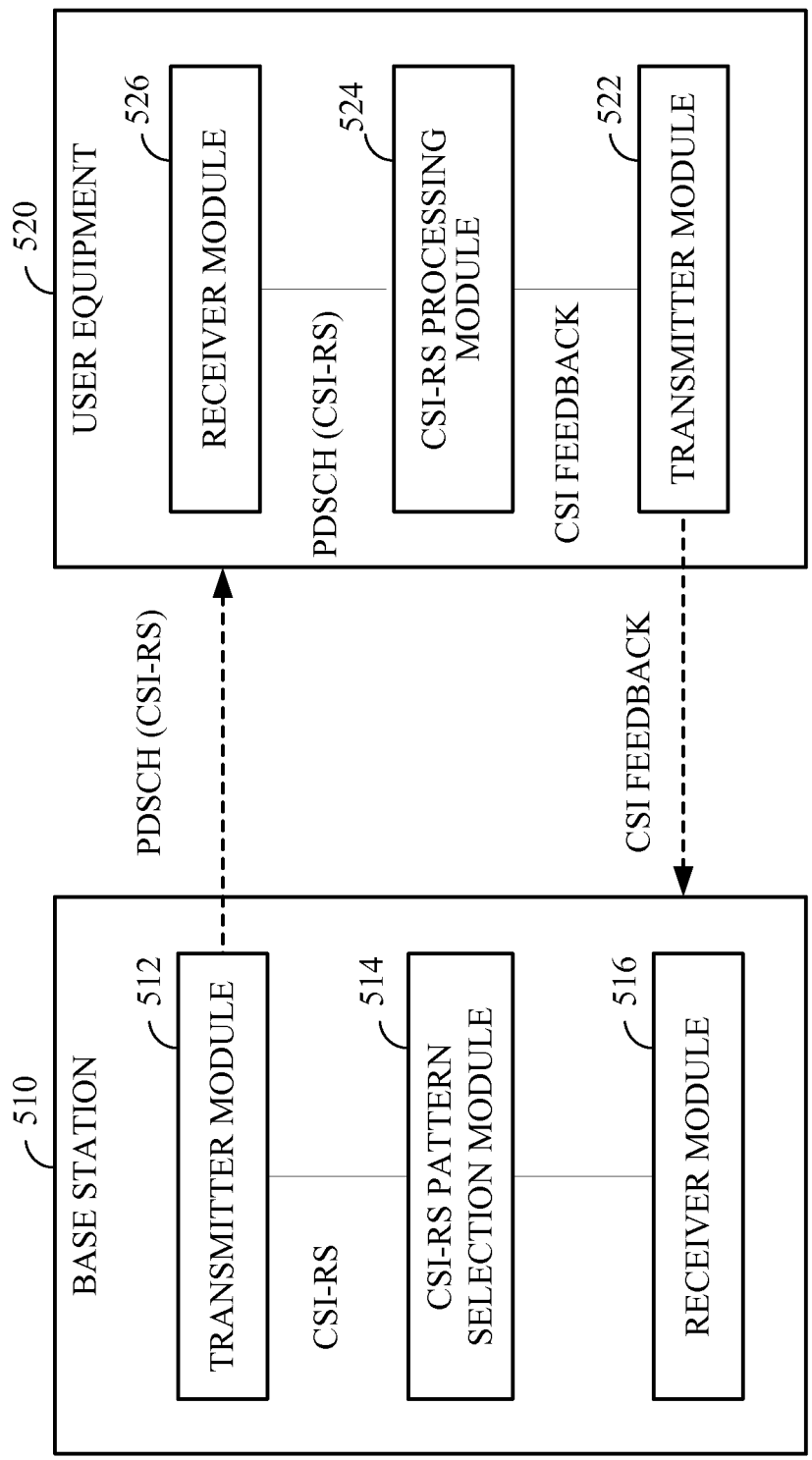
FIG. 5 shows an exemplary base station and user equipment.

FIG. 5 illustrates an example wireless system 500 with a base station (or eNB) 510 and UE 520 capable of utilizing CSI-RS patterns selected in accordance with certain aspects of the present disclosure.

According to certain aspects, the base station 510 may include a CSI-RS pattern selection module 514. The CSI-RS pattern selection module 514 may be generally configured to determine a subset of CSI-RS patterns available for a particular transmission configuration and to select one of the CSI-RS patterns of the subset. The base station 510 may transmit the CSI-RS, via a transmitter module 512, in accordance with the selected CSI-RS pattern.

As illustrated, the CSI-RS may be transmitted in a PDSCH region of a subframe. According to certain aspects, the base station 510 may signal one or more parameters to the UE 520 that indicate the selected CSI-RS pattern. For example, the base station 510 may transmit an index used to identify a CSI-RS pattern selected from the larger set of available CSI-RS patterns.

The UE 520 may receive the CSI-RS transmission (e.g., transmitted in a PDSCH region), via a receiver module 526. With knowledge of the CSI-RS pattern, the UE 520 may extract and process the CSI-RS with a CSI-RS processing module. The CSI-RS processing module may generate CSI feedback (e.g., indicating channel state information based on RS from different antenna ports).

The UE 520 may transmit the CSI feedback to the base station 510, via a transmitter module 522. The base station 510 may receive the CSI feedback, via a receiver module 516, and utilize the feedback to adjust transmission properties.

Figure 6:
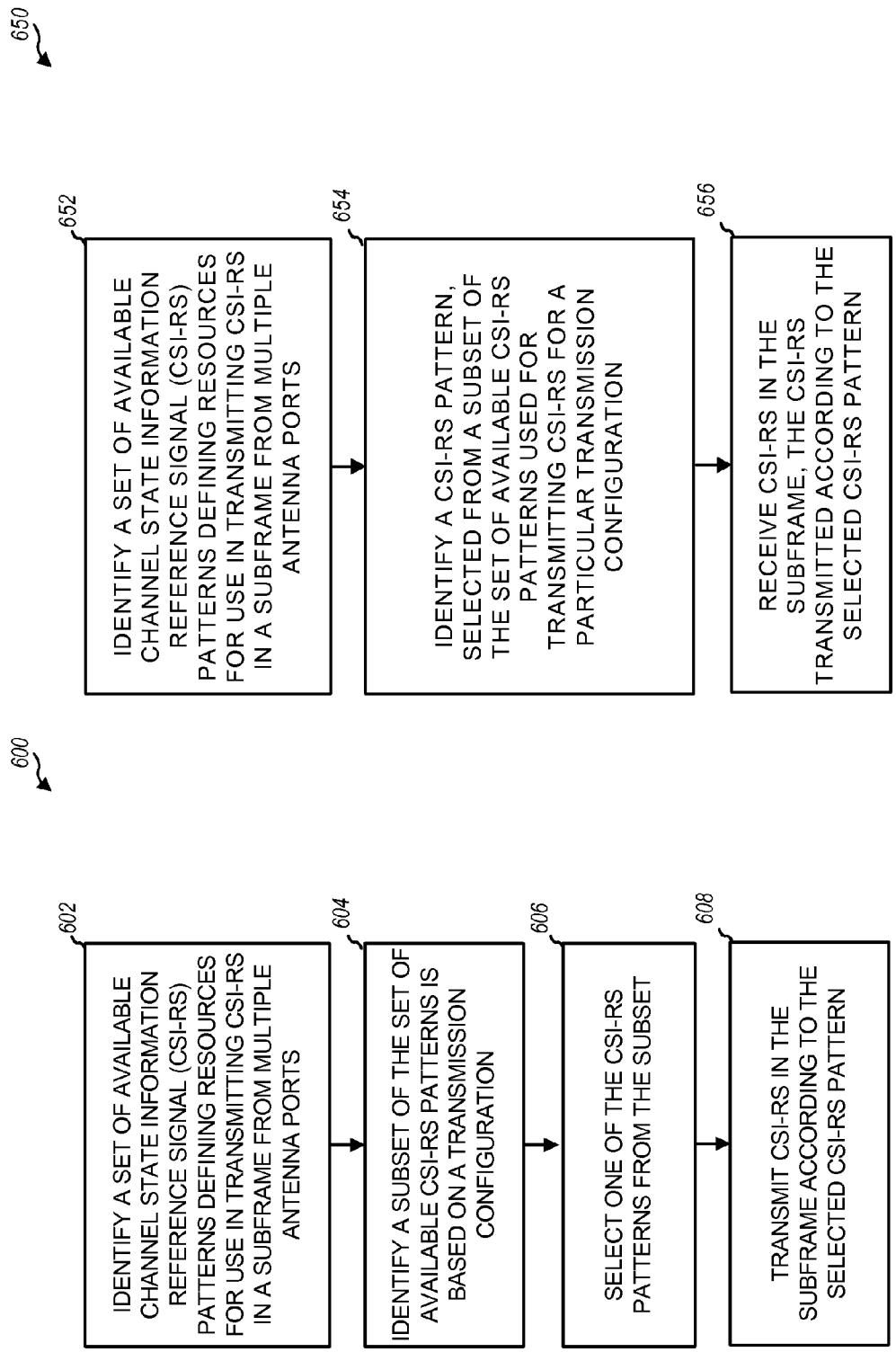
FIG. 6 illustrates example operations that may be performed by a base station and user equipment, in accordance with certain aspects of the present disclosure.

FIG. 6 illustrates example operations 600 that may be performed, for example, by a base station, such as the base station 510 of FIG. 5.

The operations 600 begin, at 602, by identifying a set of available channel state information reference signal (CSI-RS) patterns defining resources for use in transmitting CSI-RS in a subframe from multiple antenna ports. At 604, the base station may identify a subset of the set of available CSI-RS patterns based on a transmission configuration. At 606, the base station may select one of the CSI-RS patterns from the subset. At 608, the base station may transmit CSI-RS in the subframe according to the selected CSI-RS pattern. As noted above, the base station may also signal one or more parameters indicative of the selected CSI-RS pattern.

FIG. 6 also illustrates example operations 650 that may be performed, for example, by a UE, such as the UE 520 of FIG. 5.

The operations 650 begin, at 652, by identifying a set of available channel state information reference signal (CSI-RS) patterns defining resources for use in transmitting CSI-RS in a subframe from multiple antenna ports. At 654, the UE may identify a CSI-RS pattern selected from a subset of the set of available CSI-RS patterns used for transmitting CSI-RS for a particular transmission configuration. At 656, the UE may receive CSI-RS in the subframe, the CSI-RS transmitted according to the selected CSI-RS pattern. As noted above, the UE may also receive signaling of one or more parameters indicative of the selected CSI-RS pattern. As an alternative, the UE may be able to determine the selected CSI-RS pattern without such signaling, for example, based on a cell ID, the transmission configuration, and/or system timing.

While a relatively large number of possible CSI-RS patterns exist, it may be desirable, in some cases, to allocate resources for use in transmitting CSI-RS for antenna ports of a BS in an effort to achieve a number of goals. As an example, in some cases it may be desirable to have CSI-S patterns that avoid using OFDM symbols that contain antenna port 5 UE-RS symbols (e.g., for transmission mode 7). However, in deployments that do not utilize antenna port 5 UE-RS transmissions, this may result in unnecessarily reducing the number of REs available for CSI-RS. Therefore, according to certain aspects presented herein, deployments that utilize antenna port 5 for UE-RS may be configured to utilize a smaller subset of available CSI-RS patterns (those that avoid using OFDM symbols that contain antenna port 5 UE-RS symbols). Deployments that do not utilize antenna port 5 for UE-RS may be configured to utilize a larger set of available CSI-RS patterns.

According to certain aspects, CSI-RS frequency density may be 1RE per RB, per antenna port (1RE/RB/Antenna port), regardless of the number of antenna ports (e.g., whether 2Tx, 4Tx and 8Tx). According to certain aspects, it may be desirable to try and maintain a relatively uniform pattern across RBs, which may help simplify channel estimation and be more straightforward to implement than non-uniform patterns.

As noted above, the subset of available CSI-RS patterns may be dependent on a transmission configuration. An exact CSI-RS pattern selected from such a subset may be determined in a manner of ways. For example, a CSI-RS pattern may be selected as a function of a physical cell ID and the number of CSI-RS antenna ports. Additionally, or as an alternative, a selected pattern may be indicated with a signaled index from a predefined and enumerated CSI-RS pattern set, which may also depend on the number of CSI-RS antenna ports and system bandwidth.

CSI-RS for different antenna ports of the same cells may need to be orthogonally multiplexed, for example, utilizing FDM and/or TDM. In order to fully utilize the power on CSI-RS REs, it may be desirable that each OFDM symbol containing CSI-RS, contains CSI-RS of all antenna ports.

According to certain aspects, a relatively large number of CSI-RS patterns may be provided for TDD and FDD modes. The patterns may be defined in an effort to maximize reuse factors and maintain commonality between CSI-RS patterns used by advanced UEs (e.g., Release 10 LTE UEs and beyond) and Relay nodes (e.g., in case of DL timing case 3, when last OFDM symbol on the backhaul link is truncated).

FIGS. 7-19 illustrate a number of different example CSI-RS patterns. As will be described, the illustrated patterns allow for different levels of re-use of the patterns across base stations. The example resource allocations may result in a number of available CSI-RS patterns for different numbers of antenna ports (e.g., 2Tx, 4Tx and 8Tx).

Figure 7:
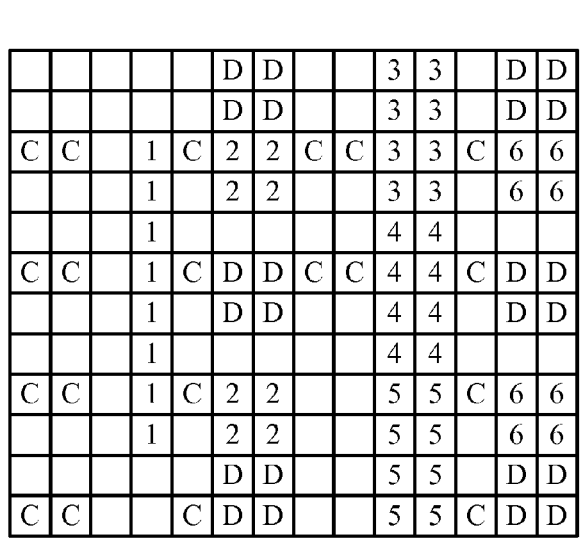
FIG. 7 illustrates example CSI-RS patterns for FDD subframes, in accordance with certain aspects of the present disclosure.
Figure 7:
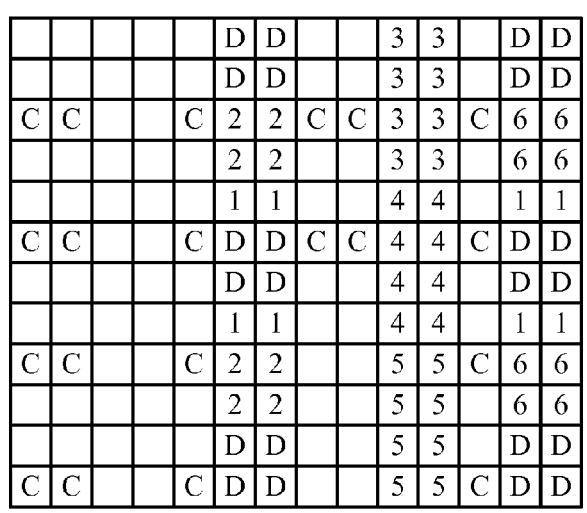
Figure 7:
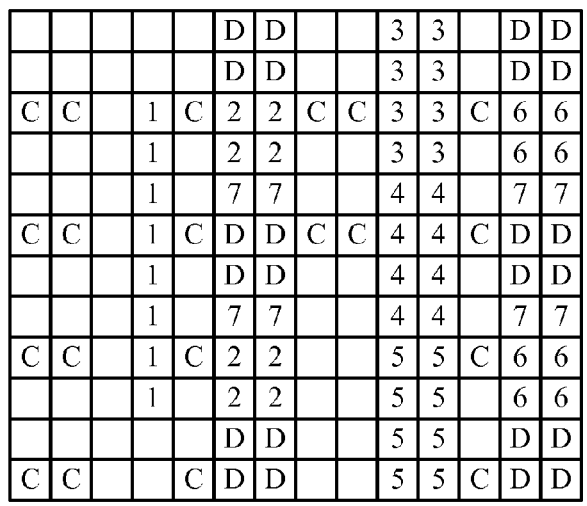

For example, FIG. 7 illustrates a resource grid 710 for an example CSI-RS patterns that may be used for frequency division duplex transmission modes, with a re-use factor of 6 for 8 port CSI-RS patterns (or a reuse factor of 12 for 4 port patterns which may be obtained by splitting each of the 8 port patterns as 2 4 port CSI-RS patterns). As illustrated, a number of REs may be dedicated for CRS (labeled "C") and for DM-RS (labeled "D"), while other REs may not be available or simply not used for CSI-RS. As illustrated, this still allows for 8 CSI-RS ports for up to 6 base stations (labeled "1" through "6"). Resource grid 720 shows a similar example that also allows for 8 CSI-RS ports for up to 6 base stations, but with the REs allocated for set "1" relocated relative to resource grid 710. Resource grid 730 provides a re-use factor of 7, by combining the REs from resource grids 710 and 720.

Figure 8:
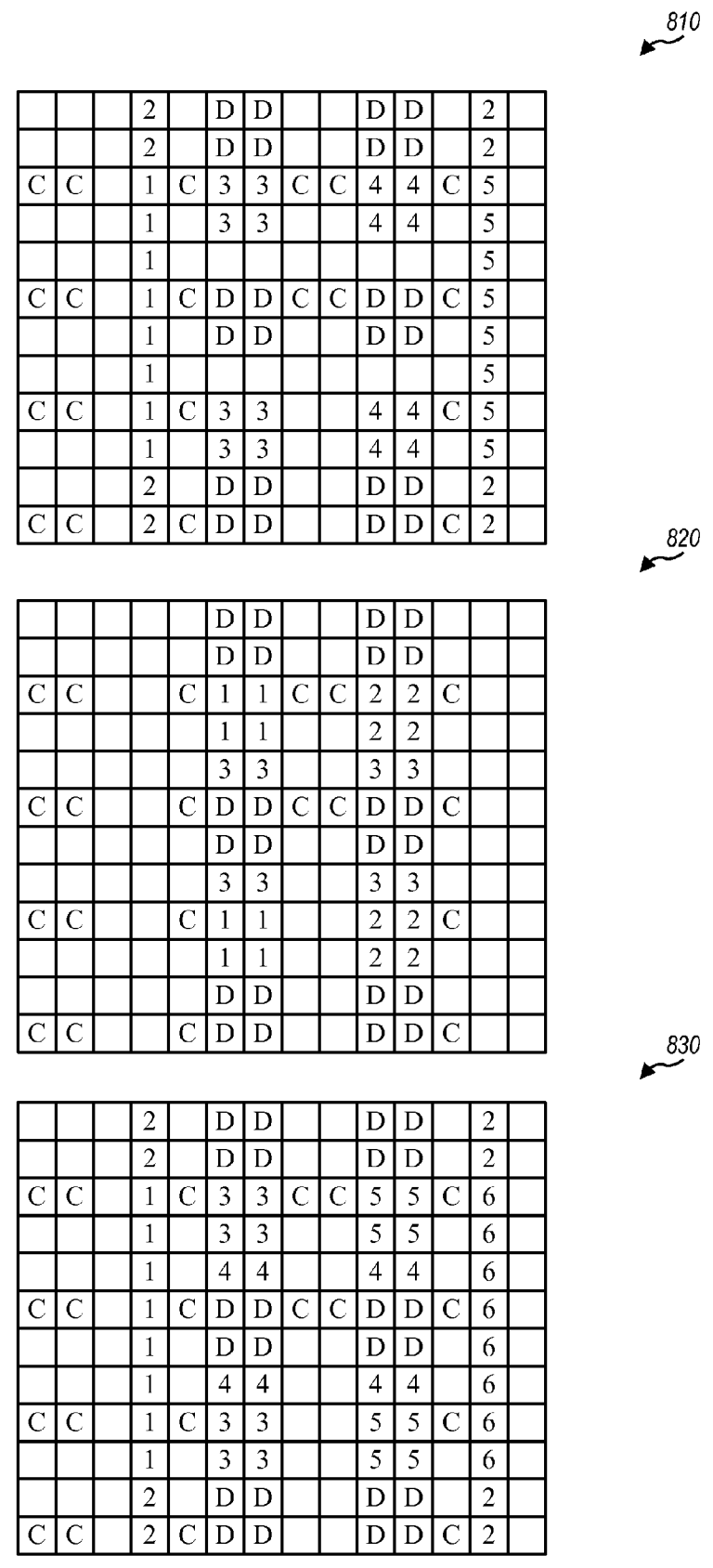
Figure 9:
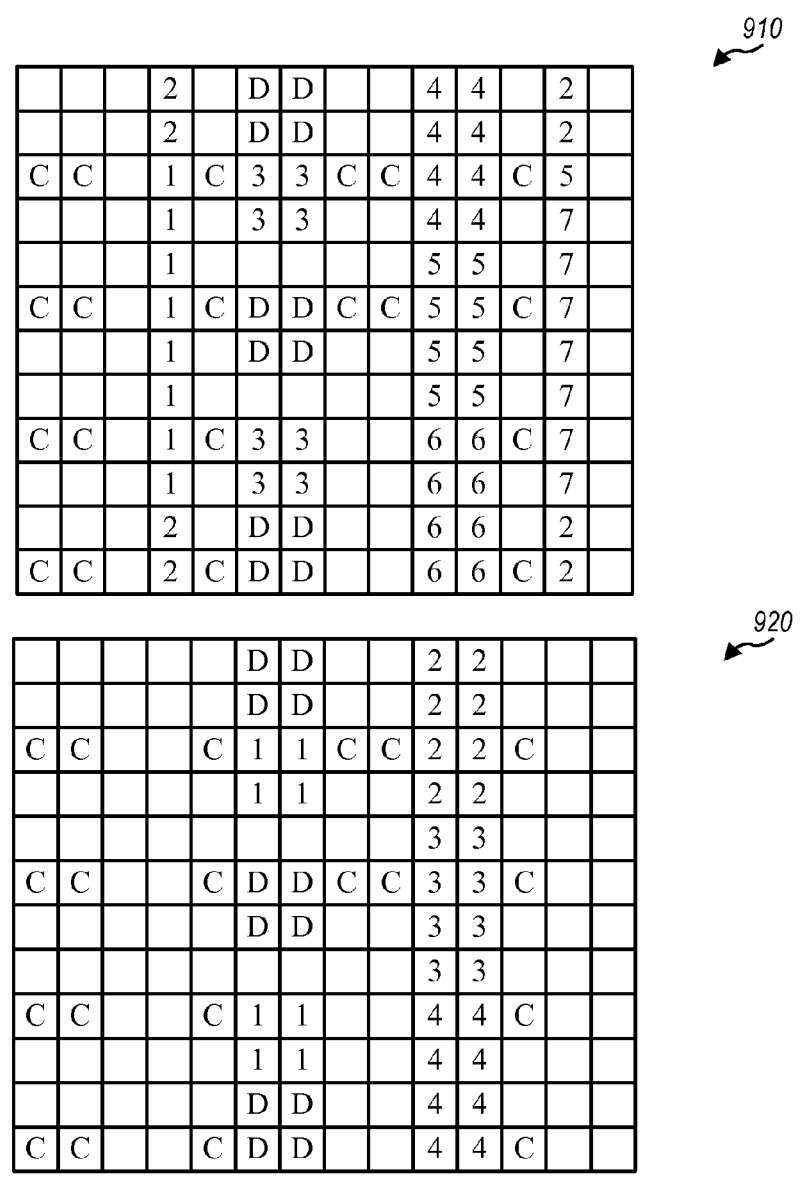

FIGS. 8-9 illustrate example CSI-RS patterns for subframes transmitted to a relay, in accordance with certain aspects of the present disclosure. For all of these example relay patterns, while 14 symbols are shown, the last symbol may be lost due to switching time. FIG. 8 illustrates resource grids 810, 820, and 830 for example CSI-RS patterns that may be used for transmissions to a relay node. While the resource grids show 14 symbols, switching time may result in loss of the last symbol. The illustrated examples in FIG. 8 may assume 2 UE-RS instances in time per subframe. As illustrated, the example shown in resource grid 810 may provide a re-use factor of 5. The re-use factor may be increased to 6, as illustrated in resource grid 830. As illustrated in resource grid 820, in some cases, the first four symbols, and last symbol, may be avoided, resulting in a re-use factor of 3. Also, among all the patterns shown in FIG. 8, if the examples are limited only to patterns with CDM-T, where CSI-RS of two antenna ports are Code Division Multiplexed (CDMed) over two contiguous REs in time, only the patterns shown in grid 820 may be used.

FIG. 9 illustrates resource grids 910 and 920, for example CSI-RS patterns that may be used for transmissions to a relay node, assuming 1 CSI-RS instance per subframe. As illustrated, the examples shown in resource grids 910 may provide a re-use factor of 7, while the example shown in resource grid 920 may provide a re-use factor of 4.

FIG. 10 illustrates resource grids 1010, 1020, and 1030 for example CSI-RS patterns that may be used for transmission in MBSFN subframes. As illustrated, the examples shown in resource grids 1010, 1020, and 1030 may provide re-use factors of 14, 12, and 15, respectively.

Figure 11:
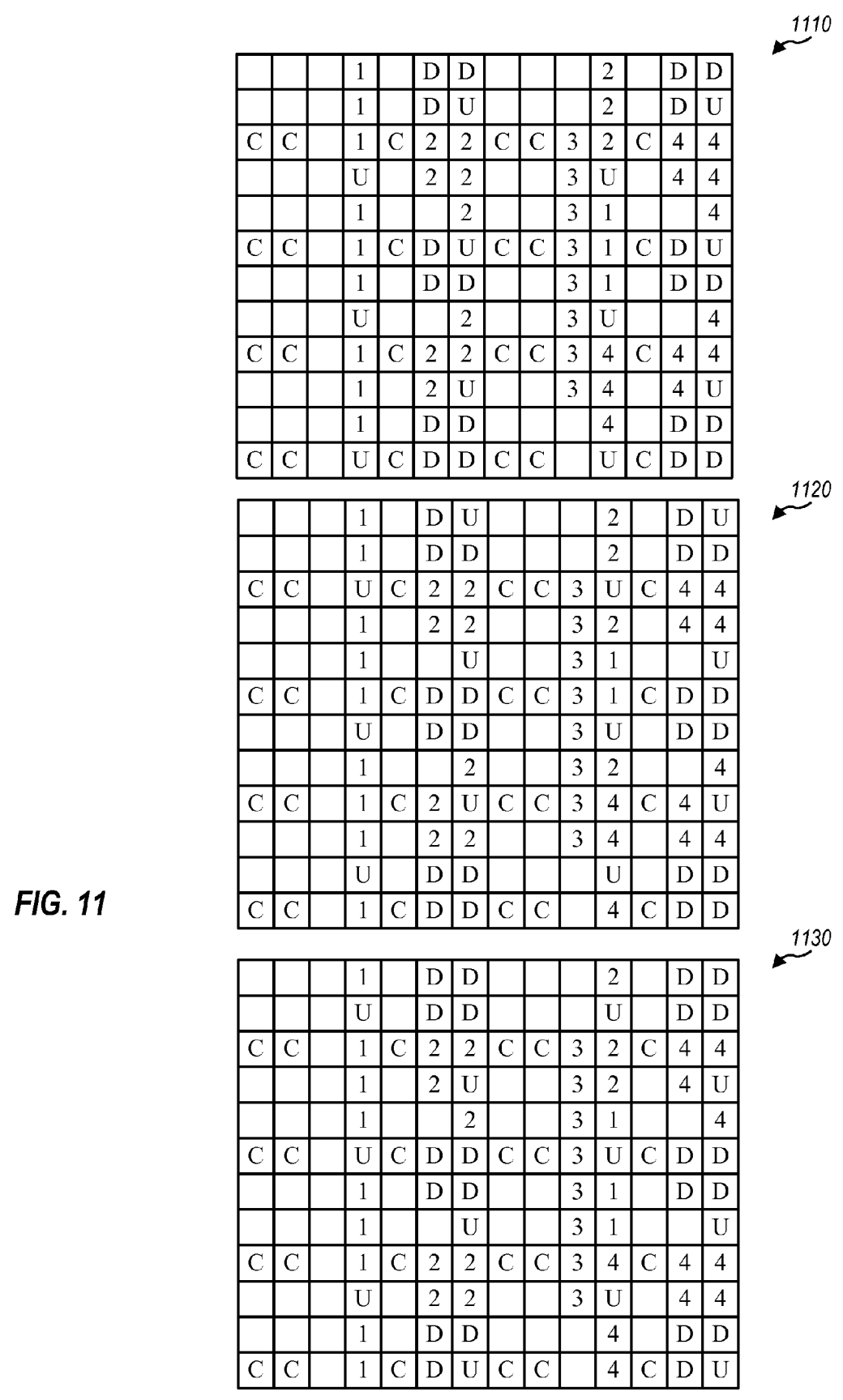

As noted above, in some cases it may be desirable for CSI-RS patterns to avoid REs that carry UE-RS transmitted by antenna port 5. FIG. 11 illustrates how, for a re-use factor of 4, a number of different CSI-RS patterns for TDD subframes are available that avoid UE-RS transmitted by antenna port 5 (REs for such transmissions labeled "U"). While, in some cases, 12, 10, 8 and 10 REs may be reserved for CSI-RS of BS 1, 2, 3, and 4, respectively, only some of these REs are actually used for CSI-RS. For example, resource grid 1110 illustrates an example allocation of 9 REs available for BS "1," 12 REs available for BS "2" and BS "4," and 8 REs available for BS "3" where all REs allocated to UE-RS port 5 are avoided. Any set of 8 REs out of these available REs could constitute an available CSI-RS pattern. Thus, with 9 REs, there are 9 possible CSI-RS patterns for BS "1" and, with 12 REs, 495 possible combinations for BS "2" and BS "4." The number of usable REs is further reduced if CDM-F CSI-RS patterns are considered. For example, the REs are grouped for each BS corresponding to CDM-F pattern where CSI-RS of two antenna ports and CDMed over 2 contiguous tones in frequency. If the REs are paired into groups of size 2, starting from the top, REs for which a paired RE in that group cannot be found may be skipped. In this example, this additional constraint reduces the number of usable REs to 8 for each of the groups. It can be seen that it is possible to allocate REs for 8 CSI-RS ports in each CSI-RS group (for the same base station number).

As illustrated by resource grids 1120 and 1130, the location of "U" REs used for antenna port 5 to transmit UE-RS may shift. As illustrated, this may change the location and, in some case the number, of REs available for CSI-RS. However, there are still a large number of CSI-RS patterns that avoid these new "U" locations that are still available. For CDM-F, with the pairing described above, it may be possible to again find a CSI-RS pattern with 8 ports for each group. It should be noted that, while not shown, the location of REs for CRS may also shift.

FIG. 12 illustrates other example resource grids 1210, 1220, and 1230, that also provide a re-use factor of 4. In these examples, 12 REs are reserved corresponding to each of BS "1", "2", "3" and "4". However, only REs not used for UE-RS are available for use for CSI-RS, which results in a fewer number of available REs for CSI-RS. Resource grid 1210 illustrates an example allocation of 11 REs available for BS "1," BS "2," and BS "4," and 10 REs available for BS "3."

Resource grid 1220 illustrates an example allocation of 11 REs available for BS "2," and 10 REs available for BS "1," BS "3," and BS "4." Resource grid 1230 illustrates an example allocation of 11 REs available for BS "3," and 10 REs available for BS "1," BS "2," and BS "4." If this example were limited to CDM-T CSI-RS patterns where CSI-RS of two antenna ports are CDMed over two contiguous REs in time, at least 8 CSI-RS ports may be accommodated in each group for all possible shifts of UE-RS of antenna port 5.

FIG. 13 illustrates still other example resource grids 1310, 1320, and 1330, that also provide a re-use factor of 5. Resource grid 1310 illustrates an example allocation of 9 REs available for BS "1," 11 REs available for BS "2," BS "3," and BS "5," and 10 REs available for BS "4." Resource grid 1320 illustrates an example allocation of 9 REs available for BS "1," 10 REs available for BS "2," BS "4," and BS "5," and 11 REs available for BS "3." Resource grid 1330 illustrates an example allocation of 9 REs available for BS "1," 10 REs available for BS "2," BS "3," and BS "5," and 11 REs available for BS "4." If this example were limited to CDM-T patterns in BS 2, 3, 4, 5, the number of REs available for CSI-RS is reduced, but 8 CSI-RS ports may still be accommodated. For BS 1, it is not possible to limit the patterns to CDM-F patterns with CDM over two contiguous tones and still accommodate 8 patterns. However, 8 CSI-RS ports may be accommodated for BS "1" using FDM patterns or by CDM-F patterns, but allowing CDM over non-contiguous tones.

FIGS. 14-18 illustrate example CSI-RS patterns for subframes transmitted to a relay, in accordance with certain aspects of the present disclosure. As noted above, while 14 symbols are shown, the last symbol may be lost due to switching time. FIG. 14 illustrates resource grids 1410, 1420, and 1430 for example CSI-RS patterns that may be used for transmissions to a relay node, assuming 2 UE-RS instances in time per subframe, that also avoid "U" REs. The examples provide a re-use factor of 3. Resource grid 1410 illustrates an example allocation of 11 REs available for BS "1" and BS "2" and 8 REs available for BS "3." Resource grids 1420 and 1430 both illustrate an example allocation of 10 REs available for BS "1" and BS "2" and 8 REs available for BS "3." One unique CSI-RS pattern for each group may be available if the example considers CDM-F limited to contiguous tones (contiguous REs in frequency).

Figure 15:
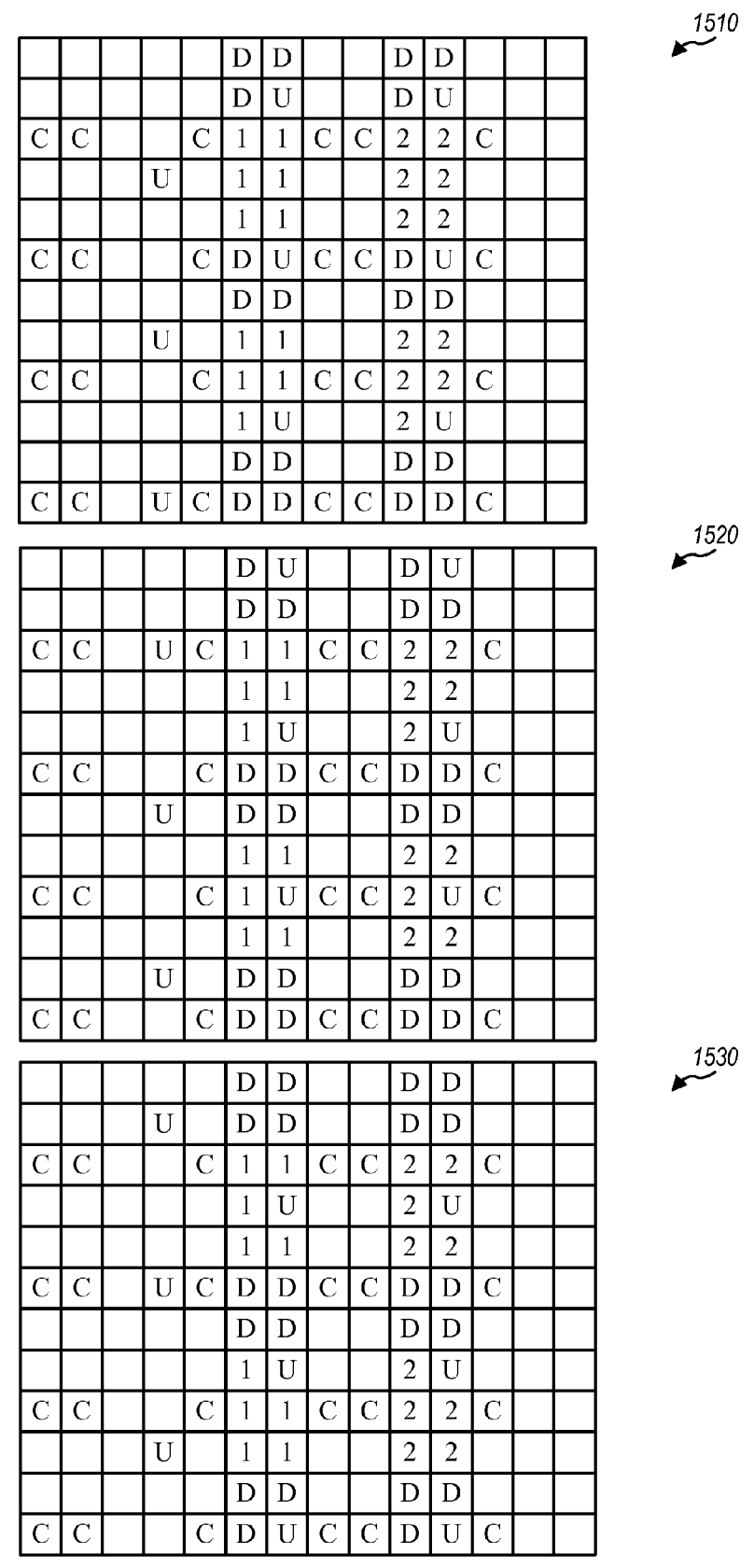

FIG. 15 illustrates resource grids 1510, 1520, and 1530 for example CSI-RS patterns that may be used for transmissions to a relay node, assuming 2 UE-RS instances in time per subframe, that also avoid "U" REs. The examples provide a re-use factor of 2. Resource grids 1510 and 1530 both illustrates an example allocation of 11 REs available for BS "1" and BS "2." Resource grid 1520 illustrates an example allocation of 10 REs available for BS "1" and BS "2.". If the examples are limited to CDM-T patterns with CDM over contiguous REs in time, the number of available REs is reduced, but 8 CSI-RS ports may still be accommodated in each group for all possible shifts of UE-RS antenna port 5.

Figure 16:
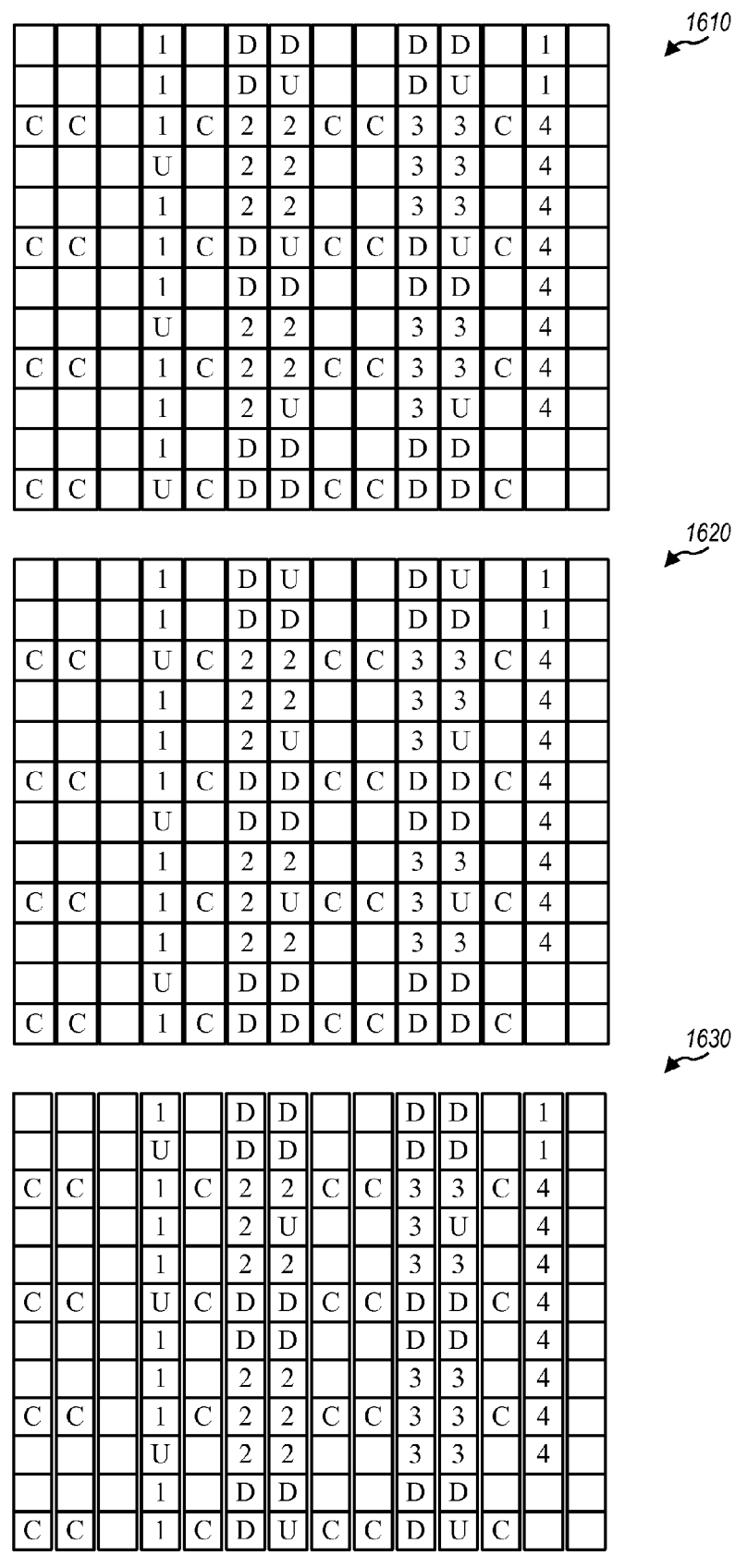

FIG. 16 illustrates resource grids 1610, 1620, and 1630 for example CSI-RS patterns that may be used for transmissions to a relay node, assuming 2 UE-RS instances in time per subframe, that also avoid "U" REs. The examples provide a re-use factor of 4. Resource grids 1610 and 1630 both illustrate an example allocation of 11 REs available for BS "1," BS "2," and BS "3" and 8 REs available for BS "4." Resource grid 1620 illustrates an example allocation of 11 REs available for BS "1," 10 REs available for BS "2" and BS "3," and 8 REs available for BS "4." If the examples in FIG. 16 are limited to CDM-T patterns with CDM over REs contiguous in time for BS 2 and 3, and CDM-F patterns with CDM over REs contiguous in frequency for BS 1 and 4, the number of available REs is reduced, but 8 CSI-RS ports may still be accommodated for each BS for all possible shifts of UE-RS antenna port 5.

Figure 17:
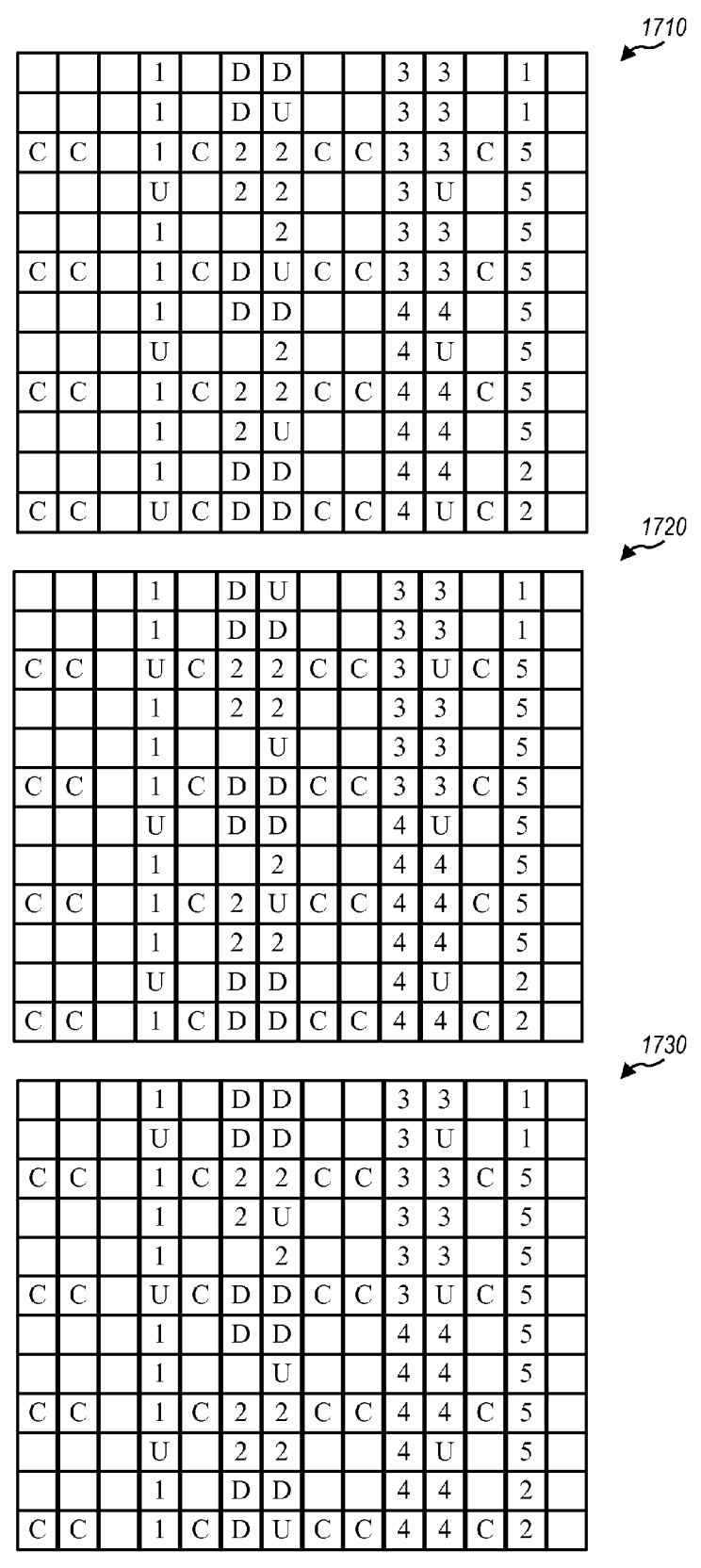

FIG. 17 illustrates resource grids 1710, 1720, and 1730 for example CSI-RS patterns that may be used for transmissions to a relay node, assuming 1 UE-RS instance in time per subframe, that also avoid "U" REs. The examples provide a re-use factor of 5. Resource grid 1710 illustrates an example allocation of 11 REs available for BS "1," BS "2," and BS "3," 10 REs available for BS "4," and 8 REs available for BS "5." Resource grid 1720 illustrates an example allocation of 11 REs available for BS "1" and BS "3," 10 REs available for BS "2" and BS "4," and 8 REs available for BS "5." Resource grid 1730 illustrates an example allocation of 11 REs available for BS "1" and BS "4," 10 REs available for BS "2" and BS "3," and 8 REs available for BS "5." If the examples in FIG. 17 are limited to CDM-T patterns with CDM over REs contiguous in time for BS 3 and 4, and CDM-F patterns with CDM over REs contiguous in frequency for BS 1, 2 and 5, the number of available REs is reduced, but 8 CSI-RS ports may still be accommodated for each BS for all possible shifts of UE-RS antenna port 5.

FIG. 18 illustrates resource grids 1810, 1820, and 1830 for example CSI-RS patterns that may be used for transmissions to a relay node, assuming 1 UE-RS instance in time per subframe, that also avoid "U" REs. The examples provide a re-use factor of 3. Resource grid 1810 illustrates an example allocation of 11 REs available for BS "1" and BS "2," and 10 REs available for BS "3." Resource grid 1820 illustrates an example allocation of 10 REs available for BS "1" and BS "3" and 11 REs available for BS "2." Resource grid 1830 illustrates an example allocation of 11 REs available for BS "1" and BS "3," and 10 REs available for BS "2." If the examples in FIG. 18 are limited to CDM-T patterns with CDM over REs contiguous in time, the number of available REs is reduced, but 8 CSI-RS ports may still be accommodated for each BS for all possible shifts of UE-RS antenna port 5.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications, comprising:
    identifying, by a base station, a set of available channel state information reference signal (CSI-RS) patterns defining resources for use in transmitting CSI-RS in a subframe from multiple antenna ports;
    identifying, by the base station, a subset of the set of available CSI-RS patterns based on a transmission configuration;
    selecting, by the base station, one of the CSI-RS patterns from the subset; and
    transmitting CSI-RS, by the base station, in the subframe according to the selected CSI-RS pattern.

2. The method of claim 1, wherein the transmission configuration involves transmission to a relay base station.

3. The method of claim 1, wherein the transmission configuration involves transmission of a Multimedia Broadcast Single Frequency Network (MBSFN) subframe.

4. The method of claim 3, wherein the subset of patterns on MBSFN subframes is larger than the subset of patterns on regular subframes.

5. The method of claim 4, wherein the regular subframe patterns are a subset of the MBSFN subframe patterns.

6. The method of claim 1, wherein the transmission configuration determines whether or not a particular antenna port is used to transmit a reference signal (RS) in the subframe.

7. The method of claim 6, wherein the particular antenna port includes antenna port 5 as defined in Long Term Evolution (LTE).

8. The method of claim 6, wherein the set of available CSI-RS patterns includes patterns that avoid REs used for the particular antenna port and patterns that include REs that could be used for the particular antenna port and the method includes:
    identifying a first subset of CSI-RS patterns that avoid resources used to transmit the RS from the particular antenna port if the transmission configuration utilizes the particular antenna port; and
    identifying a second subset of CSI-RS patterns that includes the first set of CSI-RS patterns and additional CSI-RS patterns if the transmission configuration does not utilize the particular antenna port.

9. The method of claim 1, wherein each CSI-RS pattern identifies a set of resource elements (REs) available for transmitting CSI-RS.

10. The method of claim 1, wherein the selected CSI-pattern is dependent, at least in part, on a number of antenna ports used to transmit CSI-RS.

11. The method of claim 1, further including transmitting signaling of one or more parameters used in selecting the CSI-pattern.

12. The method of claim 11, wherein the one or more parameters include an index used to select a CSI-RS pattern from the subset of CSI-RS patterns.

13. A method for wireless communications, comprising:
    identifying, by a user equipment (UE), a set of available channel state information reference signal (CSI-RS) patterns defining resources for use in transmitting CSI-RS in a subframe from multiple antenna ports;
    identifying, by the UE, a CSI-RS pattern, selected from a subset of the set of available CSI-RS patterns used for transmitting CSI-RS for a particular transmission configuration; and
    receiving, at the UE, CSI-RS in the subframe, the CSI-RS transmitted according to the selected CSI-RS pattern.

14. The method of claim 13, wherein the transmission configuration involves transmission to a relay base station.

15. The method of claim 13, wherein the transmission configuration involves transmission of a Multimedia Broadcast Single Frequency Network (MBSFN) subframe.

16. The method of claim 15, wherein the subset of patterns on MBSFN subframes is larger than the subset of patterns on regular subframes.

17. The method of claim 16, wherein the regular subframe patterns are a subset of the MBSFN subframe patterns.

18. The method of claim 13, wherein the transmission configuration determines whether or not a particular antenna port is used to transmit a reference signal (RS) in the subframe.

19. The method of claim 18, wherein the particular antenna port includes antenna port 5 as defined in Long Term Evolution (LTE).

20. The method of claim 18, wherein the set of available CSI-RS patterns includes patterns that avoid REs used for the particular antenna port and patterns that include REs that could be used for the particular antenna port and the method includes:
    identifying a first subset of CSI-RS patterns that avoid resources used to transmit the RS from the particular antenna port if the transmission configuration utilizes the particular antenna port; and
    identifying a second subset of CSI-RS patterns that includes the first set of CSI-RS patterns and additional CSI-RS patterns if the transmission configuration does not utilize the particular antenna port.

21. The method of claim 13, wherein each CSI-RS pattern identifies a set of resource elements (REs) available for transmitting CSI-RS.

22. The method of claim 13, wherein the selected CSI-pattern is dependent, at least in part, on a number of antenna ports used to transmit CSI-RS.

23. The method of claim 13, further including receiving signaling of one or more parameters used in selecting the CSI-pattern.

24. The method of claim 23, wherein the one or more parameters include an index used to select a CSI-RS pattern from the subset of CSI-RS patterns.

25. An apparatus for wireless communications, comprising:
    means for identifying a set of available channel state information reference signal (CSI-RS) patterns defining resources for use in transmitting CSI-RS in a subframe from multiple antenna ports;
    means for identifying a subset of the set of available CSI-RS patterns based on a transmission configuration;
    means for selecting one of the CSI-RS patterns from the subset; and
    means for transmitting CSI-RS in the subframe according to the selected CSI-RS pattern.

26. The apparatus of claim 25, wherein the transmission configuration involves transmission to a relay base station.

27. The apparatus of claim 25, wherein the transmission configuration involves transmission of a Multimedia Broadcast Single Frequency Network (MBSFN) subframe.

28. The apparatus of claim 27, wherein the subset of patterns on MBSFN subframes is larger than the subset of patterns on regular subframes.

29. The apparatus of claim 28, wherein the regular subframe patterns are a subset of the MBSFN subframe patterns.

30. The apparatus of claim 25, wherein the transmission configuration determines whether or not a particular antenna port is used to transmit a reference signal (RS) in the subframe.

31. The apparatus of claim 30, wherein the particular antenna port includes antenna port 5 as defined in Long Term Evolution (LTE).

32. The apparatus of claim 30, wherein the set of available CSI-RS patterns includes patterns that avoid REs used for the particular antenna port and patterns that include REs that could be used for the particular antenna port and the apparatus includes:
    means for identifying a first subset of CSI-RS patterns that avoid resources used to transmit the RS from the particular antenna port if the transmission configuration utilizes the particular antenna port; and
    means for identifying a second subset of CSI-RS patterns that includes the first set of CSI-RS patterns and additional CSI-RS patterns if the transmission configuration does not utilize the particular antenna port.

33. The apparatus of claim 25, wherein each CSI-RS pattern identifies a set of resource elements (REs) available for transmitting CSI-RS.

34. The apparatus of claim 25, wherein the selected CSI-pattern is dependent, at least in part, on a number of antenna ports used to transmit CSI-RS.

35. The apparatus of claim 25, further including means for transmitting signaling of one or more parameters used in selecting the CSI-pattern.

36. The apparatus of claim 35, wherein the one or more parameters include an index used to select a CSI-RS pattern from the subset of CSI-RS patterns.

37. An apparatus for wireless communications, comprising:
    means for identifying a set of available channel state information reference signal (CSI-RS) patterns defining resources for use in transmitting CSI-RS in a subframe from multiple antenna ports;
    means for identifying a CSI-RS pattern, selected from a subset of the set of available CSI-RS patterns used for transmitting CSI-RS for a particular transmission configuration; and
    means for receiving CSI-RS in the subframe, the CSI-RS transmitted according to the selected CSI-RS pattern.

38. The apparatus of claim 37, wherein the transmission configuration involves transmission to a relay base station.

39. The apparatus of claim 37, wherein the transmission configuration involves transmission of a Multimedia Broadcast Single Frequency Network (MBSFN) subframe.

40. The apparatus of claim 39, wherein the subset of patterns on MBSFN subframes is larger than the subset of patterns on regular subframes.

41. The apparatus of claim 40, wherein the regular subframe patterns are a subset of the MBSFN subframe patterns.

42. The apparatus of claim 37, wherein the transmission configuration determines whether or not a particular antenna port is used to transmit a reference signal (RS) in the subframe.

43. The apparatus of claim 42, wherein the particular antenna port includes antenna port 5 as defined in Long Term Evolution (LTE).

44. The apparatus of claim 42, wherein the set of available CSI-RS patterns includes patterns that avoid REs used for the particular antenna port and patterns that include REs that could be used for the particular antenna port and the apparatus includes:
    means for identifying a first subset of CSI-RS patterns that avoid resources used to transmit the RS from the particular antenna port if the transmission configuration utilizes the particular antenna port; and
    means for identifying a second subset of CSI-RS patterns that includes the first set of CSI-RS patterns and additional CSI-RS patterns if the transmission configuration does not utilize the particular antenna port.

45. The apparatus of claim 37, wherein each CSI-RS pattern identifies a set of resource elements (REs) available for transmitting CSI-RS.

46. The apparatus of claim 37, wherein the CSI-pattern selected is dependent, at least in part, on the number of antenna ports used to transmit CSI-RS.

47. The apparatus of claim 37, further including means for receiving signaling of one or more parameters used in selecting the CSI-pattern.

48. The apparatus of claim 47, wherein the one or more parameters include an index used to select a CSI-RS pattern from the subset of CSI-RS patterns.

49. An apparatus for wireless communications, comprising:
   at least one processor configured to identify a set of available channel state information reference signal (CSI-RS) patterns defining resources for use in transmitting CSI-RS in a subframe from multiple antenna ports, to identify a subset of the set of available CSI-RS patterns based on a transmission configuration, to select one of the CSI-RS patterns from the subset, and to transmit CSI-RS in the subframe according to the selected CSI-RS pattern; and
   a memory coupled with the at least one processor.

50. An apparatus for wireless communications, comprising:
   at least one processor configured to identify a set of available channel state information reference signal (CSI-RS) patterns defining resources for use in transmitting CSI-RS in a subframe from multiple antenna ports, to identify a CSI-RS pattern, to selected from a subset of the set of available CSI-RS patterns used for transmitting CSI-RS for a particular transmission configuration, and to receive CSI-RS in the subframe, the CSI-RS transmitted according to the selected CSI-RS pattern; and
   a memory coupled with the at least one processor.

51. A computer program product comprising a computer-readable medium having instructions stored thereon for wireless communications, the instructions executable by one or more processors for:
   identifying a set of available channel state information reference signal (CSI-RS) patterns defining resources for use in transmitting CSI-RS in a subframe from multiple antenna ports;
   identifying a subset of the set of available CSI-RS patterns based on a transmission configuration;
   selecting one of the CSI-RS patterns from the subset; and
   transmitting CSI-RS in the subframe according to the selected CSI-RS pattern.

52. A computer program product comprising a computer-readable medium having instructions stored thereon for wireless communications, the instructions executable by one or more processors for:
   identifying a set of available channel state information reference signal (CSI-RS) patterns defining resources for use in transmitting CSI-RS in a subframe from multiple antenna ports;
   identifying a CSI-RS pattern, selected from a subset of the set of available CSI-RS patterns used for transmitting CSI-RS for a particular transmission configuration; and
   receiving CSI-RS in the subframe, the CSI-RS transmitted according to the selected CSI-RS pattern.

\* \* \* \* \*